United States Patent [19]

Maeda et al.

[11] Patent Number: 5,187,052

[45] Date of Patent: Feb. 16, 1993

[54] OPTICAL RECORDING MEDIUM

[75] Inventors: Yoshihito Maeda, Mito; Toshiki Kaneko, Hitachi; Masaichi Nagai, Hitachi; Hisashi Andoh, Hitachi; Yoshimi Katou, Takahagi; Isao Ikuta, Iwaki; Ryuji Watanabe, Ibaraki, all of Japan

[73] Assignee: Hitachi, Ltd., Tokyo, Japan

[21] Appl. No.: 831,746

[22] Filed: Feb. 10, 1992

[30] Foreign Application Priority Data

Apr. 8, 1987 [JP] Japan ................................. 62-84778

[51] Int. Cl.$^5$ .......................... G03C 1/72; G11B 7/24
[52] U.S. Cl. ................................. 430/495; 346/135.1; 430/19; 430/270
[58] Field of Search ............... 430/290, 346, 495, 945, 430/964, 19, 270; 346/766, 135.1

[56] References Cited

U.S. PATENT DOCUMENTS

| 4,460,636 | 7/1984 | Watanabe | 428/212 |
| 4,787,077 | 11/1988 | Barton et al. | 430/945 |
| 4,808,514 | 2/1989 | Gravesteijn et al. | 430/964 |
| 5,095,479 | 3/1992 | Horigaya et al. | 430/945 |

FOREIGN PATENT DOCUMENTS

| 0184452 | 6/1986 | European Pat. Off. | 430/945 |
| 212336 | 3/1987 | European Pat. Off. | |
| 0217293 | 4/1987 | European Pat. Off. | 430/945 |
| 239166 | 9/1987 | European Pat. Off. | |
| 0387898 | 9/1990 | European Pat. Off. | |
| 0177446 | 9/1985 | Japan | 430/945 |
| 0257291 | 12/1985 | Japan | 430/945 |
| 1089889 | 5/1986 | Japan | |

OTHER PUBLICATIONS

Yamada et al, Japanese Journal of Applied Physics, vol. 26 (1987) Supplement 26-4 pp. 61-66 "High Speed Overwritable Phase Charge Disk Material".
Bordas et al, Thermochimica Acta, 107(1986) 239-265.
Akahira et al, SPIE vol. 899 Optical Storage Technology and Applications (1988) pp. 188-195.
Hackh's Chemical Dictionary, 4th Edition pp. 28-29.

Primary Examiner—Lee C. Wright
Attorney, Agent, or Firm—Antonelli, Terry, Stout & Kraus

[57] ABSTRACT

An optical recording medium, which comprises a recording layer capable of reversibly undergoing a phase change between a crystalline state and an amorphous state by irradiation of an electromagnetic energy, the crystalline state of the recording layer being composed of a single phase of substantially a three-component compound or a higher multi-component compound can attain high speed recording and high speed erasing that cannot be obtained with the conventional optical recording medium.

5 Claims, 15 Drawing Sheets

NUMBER OF REPETITION

NUMBER OF REPETITION

△ SIMPLE SUBSTANCE DEPOSITION REGION

□ TWO PHASE REGION OF COMPOUND

○ SINGLE PHASE REGION OF THREE-COMPONENT COMPOUND

2

OPTICAL RECORDING MEDIUM

This application is a continuation application of application Ser. No. 07/571,014, filed Aug. 23, 1990, now abandoned, which a continuation of application Ser. No. 178,192, filed Apr. 6, 1988 (now abandoned).

BACKGROUND OF THE INVENTION

This invention relates to a rewritable optical recording medium that can optically record, reproduce and erase information by light and heat, a method for recording information on the optical recording medium and reproducing the recorded information and a method for erasing the recorded information. Furthermore, the present invention relates to an article utilizing the properties of the optical recording medium.

Recently, researches and developments have been vigorously made on information recording media capable of recording information at desired parts at a high density and a high speed, and optical recording media capable of recording and reproducing information by irradiation of laser beam spot and erasing the recorded information and rewriting new information by the laser beam have been so far proposed.

The conventional optical recording media can be classified into various types such as a pit-forming type, a bubble or uneven surface-forming type, a photomagnetic type, a phase change type, etc. on the basis of what physical change is brought to the medium when heated by a laser beam spot, 1.5 μm in diameter, as disclosed in Nikkei Electronics January 4 issue (1982), page 86 et seq. under the title "Optical disk memory that has been just used in image files".

Among these types, only optical recording media of phase change type are rewritable. So far proposed optical recording media of phase change type are those having a thin film comprising a composition containing a chalcogenide based material or a lower oxide (Japanese Patent Publication No. 47-26897).

The optical recording media of phase change type include those based on a phase change between the amorphous state and the crystalline state or between one crystalline state and another crystalline state. Chalcognide-based substances mainly belong to the phase change type between the amorphous state and the crystalline state and include those disclosed in the Japanese Patent Publication No. 47-26897 and tellurium compounds, etc. disclosed in Japanese Patent Application Kokai (Laid-open) No. 60-253034. Cu-Al-Ni alloy or In-Sb alloy disclosed in Japanese Patent Application Kokai (Laid-open) No. 60-46339 belong to the phase change type between the crystalline states. In these optical recording media, recording and erasing are carried out by reversibly changing the structural state from one to another or vice versa. In those media of phase change type between the amorphous state and the crystalline state, recording and erasing are carried out by using the amorphous state for a recording state and the crystalline state for an unrecording state.

One of the important requirements for an optical recording medium is higher speed recording and erasing.

Conventional, rewritable optical recording media of phase change type, including those of phase change type between the amorphous state and the crystalline state and those of phase change type between one crystalline state and another crystalline state have such a problem as low speed erasing.

SUMMARY OF THE INVENTION

An object of the present invention is to provide a rewritable optical recording medium of phase change type between an amorphous and a crystalline state, which is capable of recording and erasing information at a high speed.

Another object of the present invention is to provide a method for recording information on such an optical recording medium of phase change type between the amorphous state and the crystalline state at a high speed and a method for erasing the recorded information at a high speed.

Other object of the present invention is to provide an article utilizing such an optical recording medium of phase change type between the amorphous state and the crystalline state.

According to the present invention, a recording layer whose crystalline state is composed essentially of a single phase of three-component compound or a single phase of higher multi-component compound is provided in the recording layer capable of undergoing a reversible phase change between the amorphous state and the crystalline state.

The object of the present invention to make high speed recording and erasing has been actually attained by an optical recording medium comprising a recording layer whose crystalline state is composed of a single phase of three-component compound or a single phase of a four-component compound.

The three-component compound or four-component compound herein referred to means a compound having a crystal structure directly determined from the Brogg's diffraction angle in the X-ray diffraction.

In the present optical recording medium, the crystalline state of the recording medium may not always be composed only of a single phase of a three-component compound or a single phase of higher multi-component compound. That is, the crystalline state may be composed of a single phase containing a three-component compound or a higher multi-component compound as the main compound, and thus may be composed substantially of a single phase of a three-component compound or a higher multi-component compound.

The recording layer can be formed from a raw-material composed of a mixture of components that can form a three-component compound or a higher multi-component compound by any thin film-forming means such as sputtering, vapor deposition, coating, plating, etc. When the mixture of components as the raw material is deviated from a composition capable of forming a desired three-component or higher multi-component compound, a single phase containing the deviated component or components is formed, but is, of course, practically applicable. Actually, the single phase must contain at least 90% by atom of a three-component compound or a higher multi-component compound. That is, the amount of the three-component compound or higher multi-component compound must not be less than 90% by atom in the single phase.

The recording layer can contain other components than those which form the three component compound or the higher multi-component compound within such a range that the crystal structure of the single phase of the three-component compound or higher multi-component compound can be maintained. The crystallization temperature and the melting temperature of the compound can be controlled and the sensitivity of recording and erasing can be increased thereby. In case of the single phase of a three-component compound $In_3SbTe_2$, the melting point of the three component compound can be lowered and the sensitivity of recording and erasing can be further increased by adding at least one of silver (Ag), tin (Sn) and copper (Cu) thereto. In the case of $In_3SbTe_2$, the total content of silver, tin and copper is desirably not more than 5% by atom. So long as the total content of silver, tin and copper is not more than 5% by atom, these additive components can undergo solid solution in the crystals, maintaining the crystalline state of the single phase of the three-component compound. However, when the content of silver, tin and copper increases and exceeds 10% by atom in total, another compound will be formed, resulting in phase separation and losing the single phase.

The present invention will be described in detail below, referring to the drawings.

BRIEF DESCRIPTION OF THE INVENTION

Figure 26A:
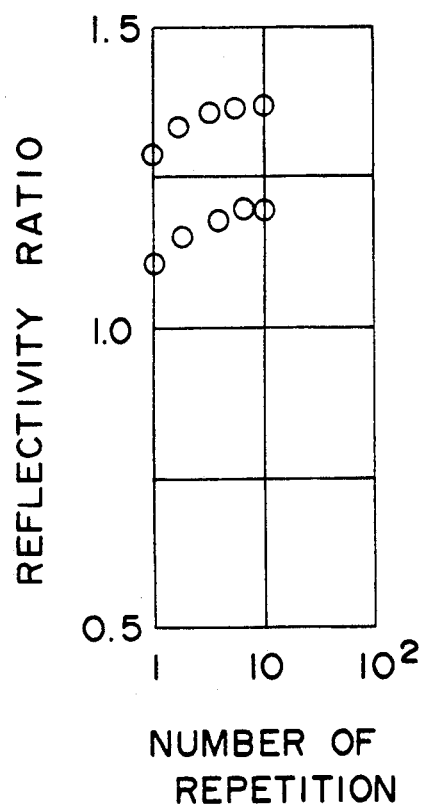
Figure 26B:
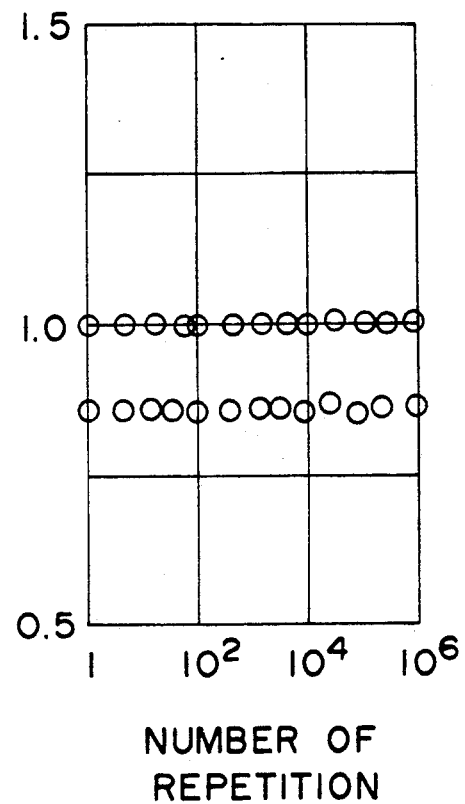

FIGS. 26(a) and 26(b) are characteristic diagrams showing a relationship between the number of repetitions of recording and erasing and the reflectivity of an optical recording medium containing $CuZn_2InTe_4$.

Figure 27:
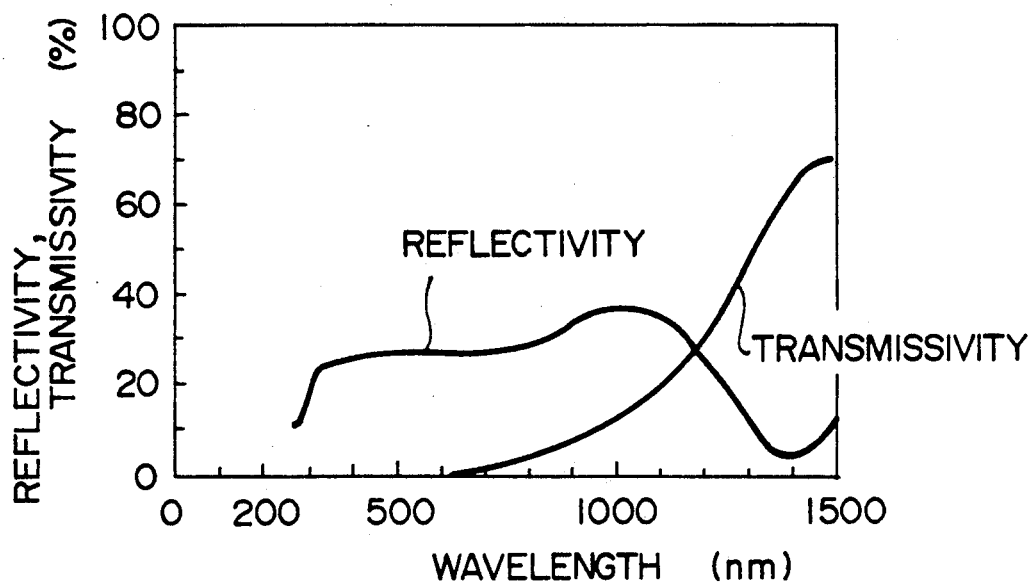
Figure 28:
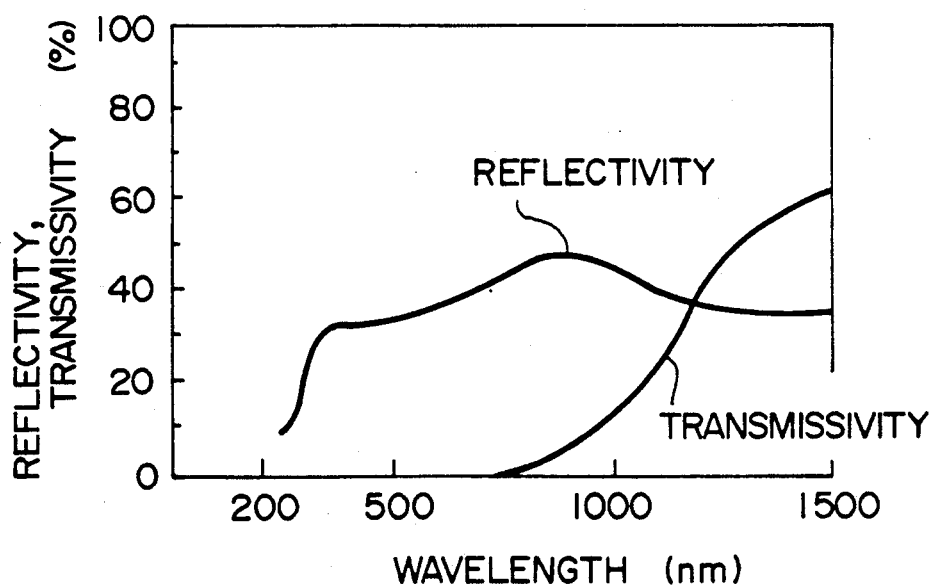

FIGS. 27 and 28 are optical characteristic diagrams of $Bi_{15}Ge_{30}Te_{55}$.

Figure 29:
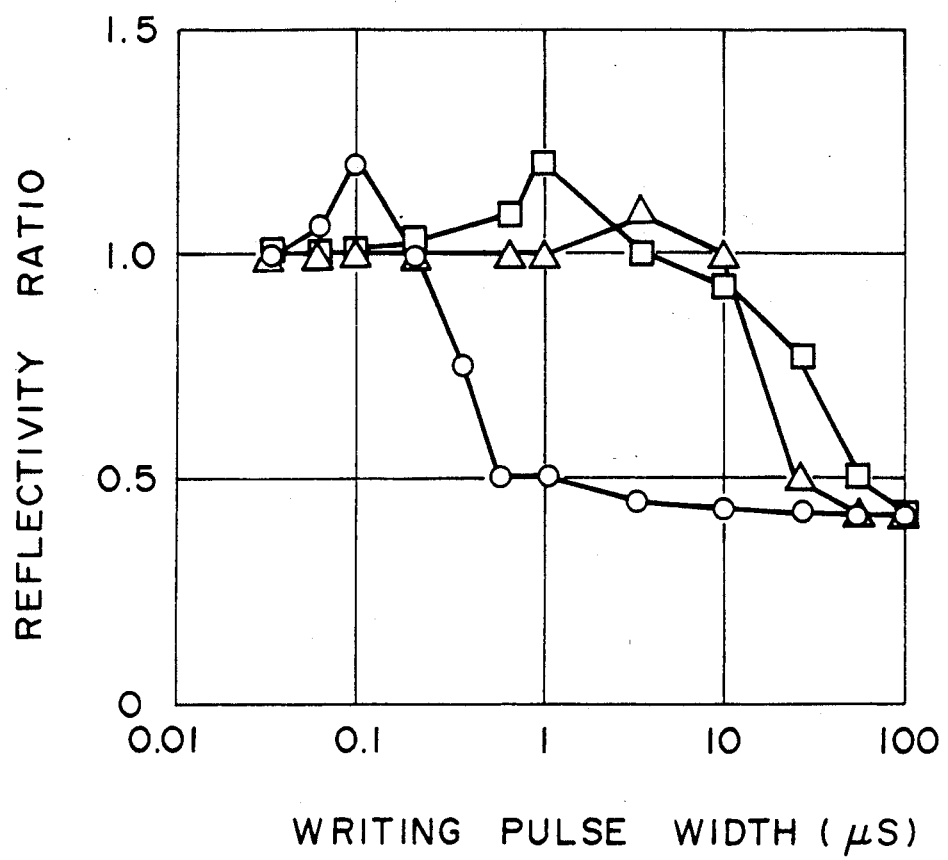

FIG. 29 is a characteristic diagram showing changes in reflectivity ratio by changes in writing pulse width.

Figure 30:
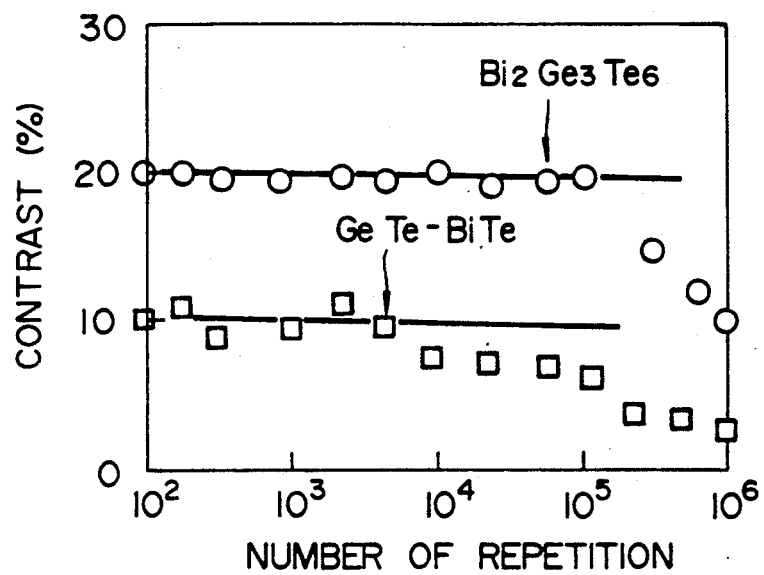

FIG. 30 is a characteristics diagram showing a relationship between the number of repetitions of recording and erasing and the contrast.

Figure 31:
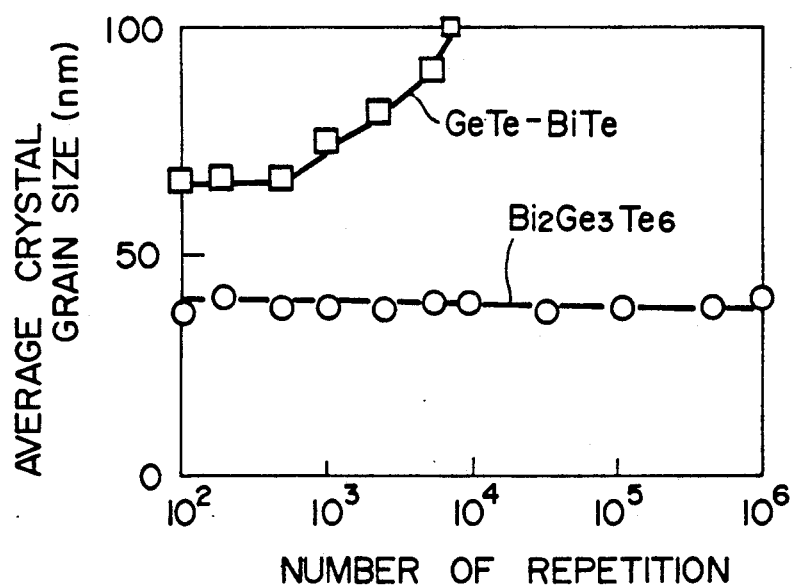

FIG. 31 is a characteristic diagram showing a relationship between the number of repetitions of recording and erasing and the average crystal grain size.

DETAILED DESCRIPTION OF THE INVENTION (a) Structure of an optical recording medium The present optical recording medium is in a structure which comprises a substrate and a recording layer formed thereon. The substrate for use in the present invention includes a glass substrate, a metal substrate such as an aluminum substrate, an organic resin substrate such as those of polycarbonate, polymethylmethacrylate, etc.

Figure 1:
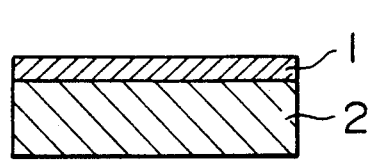
FIGS. 1 to 6 are schematic cross-sectional views showing the structures of the present optical recording media.

FIG. 1 shows one embodiment of the present optical recording medium, where a recording layer 1 is provided on a substrate 2. The recording layer 1 has a thickness of preferably 50 to 200 nm and an influence of heat conduction can be disregarded in this range at the phase change. An electromagnetic energy can be applied to the medium from either substrate side or recording layer side.

Figure 2:
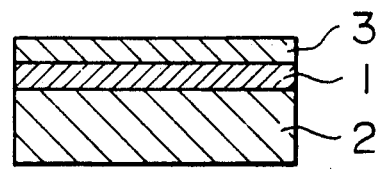

FIG. 2 shows that a surface protective layer 3 is further provided on the recording layer 1. For the surface protective layer 3, ceramics with a good corrosion resistance or a good wear resistance are desirably used. The thickness of the surface protective layer 3 is desirably 100 to 500 nm, particularly 100 to 200 nm. Suitable ceramics for the surface protective layer include inorganic oxides such as $SiO_2$, $Al_2O_3$, $Ta_2O_5$, $ZrO_2$, etc., nitrides such as $Si_3N_4$, TaN, ZrN, AlN, TiN, etc., and fluorides such as SiF, etc.

Figure 3:
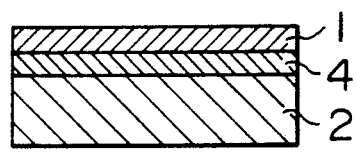

· FIG. 3 shows that a heat shielding layer 4 is provided between the substrate 2 and the recording layer 1. The heat shielding layer 4 is effective when the substrate material is an organic resin. As the material for the heat shielding layer 4, the same material as that for the surface protective layer can be used. The thickness in a range of 100 to 200 nm is quite effective for the heat shielding.

Figure 4:
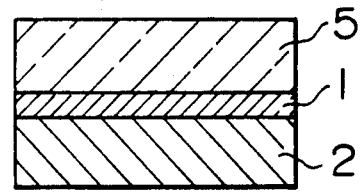

FIG. 4 shows such a structure that the recording layer 1 is sandwiched between the substrate 2 and a glass plate 5. The surface precision of the recording layer 1 can be improved to give a flat surface with much less unevenness thereby.

Figure 5:
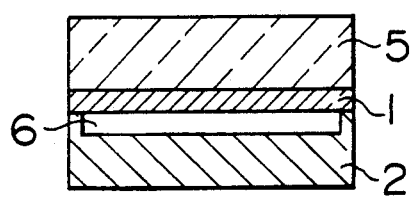

FIG. 5 shows that a recess is provided on the surface of the substrate 2 and the recording layer 1 is provided over the recess. The space 6 formed between the substrate 2 and the recording layer 1 is filled with air. Since the air is of very poor heat conductivity, transmission of the heat through the substrate 2 can be made smaller by the air when an electromagnetic energy spot is focused onto the recording layer. That is, the desired part of the recording layer can be locally heated thereby to undergo a phase change and much accelerate the recording speed and the erasing speed. In the structure as shown in FIG. 5, the electromagnetic energy must be applied to the recording layer 1 from the overhead of the glass plate 5.

Figure 6:
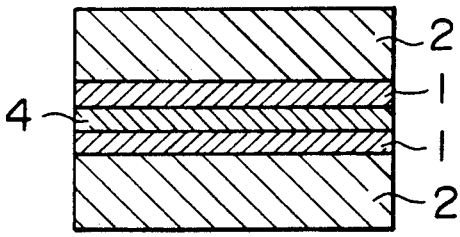

FIG. 6 shows that a pair of substrates 2 each provided with a recording layer 1 on one side are brought into contact through a heat shielding layer 4 to make the recording layers 1 face each other, where the substrates 2 are preferably transparent glass substrates to make possible recording from both sides.

(b) Methods for recording, reproduction and erasing

In the present invention, information can be recorded by locally focusing an electromagnetic energy to the desired part of the recording layer to make the electromagnetic energy-focused part undergo a phase change. Recording can be made by using any of the amorphous state and the crystalline state. That is, recording is made by using one of the amorphous state and the crystalline state and erasing is made by using the other state.

According to a specific embodiment of the present invention, high speed recording and high speed erasing can be made by using the amorphous state for recording and by using the crystalline state for erasing. That is, desirably recording is made by focusing an electromagnetic energy spot onto the recording layer in the crystalline state, thereby phase changing the crystalline state into the amorphous state, whereas erasing is made by phase changing the amorphous state into the crystalline state, thereby returning the recorded state to the original unrecorded state.

Reproduction can be made by detecting the state of the parts recorded by the phase change. Actually, reproduction can be carried out as optical changes.

The optical properties of the recording layer of the present optical recording medium are locally changed by a phase change. For example, reflectivity, transmissivity, absorbance, emissivity, magnetic Kerr effect, etc. are changed by a phase change. Thus, information can be reproduced by detecting any one of these optical properties.

As the electromagnetic energy, photo energy, electron energy, etc. can be utilized. The photo energy includes a laser beam, a xenon lamp, etc.

(c) Application:

The present optical recording medium can be used as an optical disk by providing a recording layer on a disk with tracking grooves, and also as an optical card or as a digital tape for audio appliances.

Figure 7:
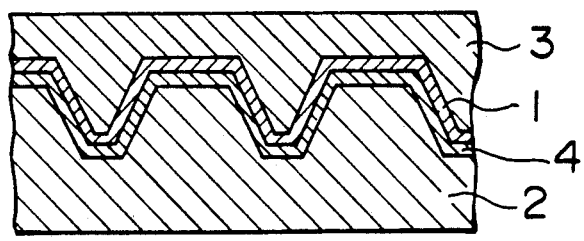
FIG. 7 is a schematic cross-sectional view in part of an optical card according to one embodiment of the present invention.

The optical card can be provided by forming a recording layer on the tracking grooves-provided surface of a substrate. FIG. 7 shows a preferable structure of the optical card, where a heat shielding layer 4 is formed on a substrate 2 and a recording layer 1 is formed on the heat shielding layer 4. The surface of the recording layer 1 is protected by a surface protective layer 3.

The audiodigital tape can be provided by forming a recording layer on the tracking grooves-provided surface of a flexible organic resin tape. The surface of the recording surface is desirably further protected with a protective layer.

Other requirements for an optical recording medium than the high speed recording and high speed erasing are a high resistance to moisture and oxidation, a high productivity, a high S/N ratio, etc. Furthermore, it is required that after repetitions of the phase change between the amorphous state and the crystalline state the same amorphous state and crystalline state can be always obtained and that these states will not change even after the optical recording medium is left in these states for a long time. The last requirement is very important for the rewritable optical recording medium.

The conventional optical recording medium of phase exchange type between the amorphous state and the crystalline state or between one crystalline state and another crystalline state is not satisfactory in the erasing speed. For example, a chalcognide based material actually has a recording speed of actual level such as 0.2 $\mu$s, whereas its erasing speed is very low, for example, 5 $\mu$s.

Furthermore, the Te-based recording material has such a problem that it is readily oxidized with the moisture in the air.

The present optical recording medium has not only high recording speed and erasing speed, but also other properties of high level.

The function of the present invention will be described in detail below, referring to a recording layer whose cristalline state is of a single phase of three-component compound.

FUNCTION

Thermodynamic phase rule can be given by the following equation under a constant pressure, for example, the atmospheric pressure:

$$f = C - p + 1$$

where C stands for the number of components, p the number of phases and f the degrees of freedom.

In a single phase of a three-component compound, $C=3$ and $p=1$, and thus the degrees of freedom $f=3$. Likewise, in a single phase of a two-component compound, $f=2$. The degrees of freedom f is the numbers of variable thermodynamic quantity. For example, a single of three-component compound has two degrees of freedom besides the temperature. In other words, a single phase of three-component compound has one more degree of freedom for the composition than a single phase of two-component compound. This means that the three-component compound has less occurrence of phase separation (multi-phase formatoin) against changes in the single phase composition, as compared with the two-component compound. Thus, in the formation of a recording layer by vapor deposition or sputtering, the desired composition has been so far prepared by high level composition control, whereas in a single phase composition of three-component compound the single phase composition can be more readily prepared. This is effective for considerably increasing the productivity of optical recording medium, and also effective for local changes in the composition which occur at the repetitions of recording and erasing. Thus, the single phase can be maintained and the recording and erasing characteristics can be stabilized, resulting in an increase in the reliability. Furthermore, repetitions of recording and erasing can be carried out stably, resulting in an increase in the number of the repetitions. The crystallization from an amorphous state often involves complicated processes, e.g. nucleation, phase separation, structural relaxation, etc. The structural change due to the phase separation requires a long distance diffusion of atoms and thus the structure having a longer diffusion distance and a low diffusion rate (diffusion constant) has a lower crystalline rate. Nucleation of a plurality of phases (multi-phase) having considerably different crystal structures due to the phase separation requires a very long time owing to boundary strains. However, the long distance diffusion can be innecessitated by making a single crystallization phase and the crystallization can be highly accelerated by shorter distance diffusion in the order of band length. Furthermore, since the crystallization proceeds in the same crystal structure, the strains become smaller and the nucleation can be also facilitated. Owing to the foregoing physical factors, the erasing speed of the optical recording medium comprising a recording layer of single phase is higher than that of the conventional recording medium based on the phase separation.

The phase change between the amorphous state and the crystalline state in a single phase has a less volume change than the phase separation in a multi-phase. In the multi-phase, the crystalline state involve an excess volume owing to the misfit states between one phase and another phase, whereas in a single phase there is no misfit state. In other words, the material has a less fatigue due to the volume change that occurs at repetitions of recording and erasing, and the single phase has an improved repetition characteristic than the plurality of phases.

The crystalline state (erasing) in the single phase has a less strain energy at the crystal grain boundary, as described before, but those in the multi-phase have a very large strain energy. The strain energy at the grain boundary can be measured as a grain boundary energy. According to the teaching of crystal grain growth rate in the metallurgy, the crystal grain growth rate dD/dt has a relationship with boundary energy $\gamma$, given by the following equation:

$$\frac{dD}{dt} = k \cdot \frac{\gamma}{D}$$

where D is an average diameter of crystal grains and k a constant.

Thus, the crystal grain growth rate will be higher with increasing grain boundary energy $\gamma$. That is, the crystal grain growth is larger when the grain boundaries are composed of a multi-phase and is smaller when composed of a single phase. This means that the single crystal phase has less crystal grain growth and consequent less reduction in the S/N ratio due to the heat cycles of recording and erasing.

As described above, the conventional recording layer materials are in a mixture of phases containing additive elements without any consideration of stoichiometry of a compound only to improve their characteristics, and thus the chemical bond correlations among the atoms therselves are indefinite in such a mixture of phases. The present invention provides an optical recording medium having a recording layer composed of a chemically stoichiometric compound, based on the finding that such a mixture of phases (multi-phase) does not improve the overall characteristics of an optical recording medium. Generally, a chalcogenide-based compound is a covalent bond solid. The covalent bond solid herein referred to is a solid, where the bonds of atoms themselves are mostly of the covalent bond type, and quantitively a solid whose covalent bond degree $\alpha_c$, for example, by LCAD method (or atomic orbital method) is 0.5 or more (W. A. Harrison: Electronic Structure and Physical Properties of Solids, translated by Tadanobu Kojima, Kazuko Kojima and Eizaburo Yamada and published by Gendai Kogaku-sha, Japan, page 117). The resistance to moisture and oxidation of a recording layer can be considerably improved by making the recording layer from a covalent bond solid of three-component compound. The solid of three-component compound is a chemically stoichiometric composition or is very approximate thereto, and thus is saturated with the covalent bonds and the excess valence electron density is so small that no bonds are formed between the oxygen atoms or between the water molecules from the outside, that is, the solid undergoes neither oxidation nor hydration (hydroxidation). Further, the stoichiometric compound is generally in a thermodynamically highly stable and thus undergoes no oxidation or hydration-decomposition with the result of less liberation of toxic single elements.

It can be seen from the foregoing that an optical recording medium whose recording layer is composed of a single phase of three-component compound at erasing can effectively overcome the problems of the conventional materials for the recording layer owing to the physico-chemical characteristics of the recording layer composed of a single phase of three-component compound and can further improve the characteristics of the optical recording medium. It has been found that the physicochemical characteristics of a recording layer composed of a single phase of three-component compound do not improve the characteristics of the optical recording medium as independent factors, but act integrally to bring about a synergistic effect. The present invention is also applicable to a recording layer composed of a single phase of four-component compound or higher multi-component compound.

The three-component compound for use in the present invention includes, for example, $Au_2SeTe$, $AgGaTe_2$, $BaSb_2Zn$, $(AuSb)_2Te_3$, $Ag_8GeTe_5$, $Bi_2Ge$, $AuAgTe_2$, $AgIn_5Te_8$, $Bi_4GeTe_7$, $Ag_8SnSe_5$, $AgGaSe_2$, $Bi_4PbTe_7$, $AgSnSe_2$, $AgSbSe_2$, $BiPb_4Te_5$, $Ag_3AuTe_2$, $Ag_9GaSe_2$, $Bi_2Pb_2Se_5$, $AgSbTe_2$, $BaSb_2Se_4$, $Bi_4TeS_2$, $AgBiTe_2$, $Ba_2SnSe_4$, $BiGa_2Se_4$, $CuIn_5InTe_8$, $Ga_4GeSe_8$, $Bi_2SeTe_2$, $CuInTe_2$, $GaGeSe_3$, $As_3InSe_3$, $Cu_3SbSe_4$, $GaSe_6Ag_9$, $AsTlSe_2$, $CuAgSe$, $Ga_2PbSe_4$, $Tl_4SnSe$, $Cr_2P_2Se_6$, $GePtSe$, $AsGeSe$, $CsCu_8Se_6$, $ZnIn_2Te_4$, $AuCuTe_4$, $In_2MnTe_4$, $BiTlTe_2$, $Bi_2PbTe_4$, $In_3SbTe_2$, $CdIn_2Te_4$, $Bi_2PbSc_4$, $Mg_2Al_2Se_5$, $CdGa_2Se_4$, $Cu_2SnTe_3$, $MnGa_2Se_4$, $Cd_4GeSe_6$, $Cu_2GeTe_3$, $NiSeTe$, $CdIn_2Se_4$, $Pb_3SbTe_4$, $CdTlSb$, $Pd_3In_4Sb_2$, $Tl_{12}Sn_2Se_5$, $Sb_2SeTe_4$, $Tl_2SnSe_3$, $Sb_2SnTe_4$, $Tl_2SnSe_3$, $CuAlS2$, $TlCu_2Se_2$, $CuAlSe_2$, $AgAlS_2$, $CuAlTe_2$, $AgAlSe_2$, $CuGaS_2$, $AgAlTe_2$, $CuGaSe_2$, $AgGaS_2$, $CuGaTe_2$, $AgGaSe_2$, $CuInS_2$, $AgGaTe_2$, $CuInSe_2$, $MgSiP_2$, $CuInTe_2$, $MgSiAs_2$, $AgInS_2$, $MgSiSb_2$, $AgInSe_2$, $MgGeAs_2$, $AgInTe_2$, $MgGeSb_2$, $MgSnP_2$, $ZnSiP_2$, $MgSnAs_2$, $ZnSiAs_2$, $MgSnSb_2$, $ZnSiSb_2$, $ZnGeP_2$, $CdSiP_2$, $ZnGeAs_2$, $CdSiAs_2$, $ZnGeSb_2$, $CdSiSb_2$, $ZnSnP_2$, CdGeP$_2$, ZnSnAs$_2$, CdGeAs$_2$, ZnSnSb$_2$, CdGeSb$_2$, CdSnP$_2$ and CdSnAs$_2$.

A four-component compound for use in the single phase in the recording layer includes, for example, (Cu,Hg)$_{12}$Sb$_4$Se$_{13}$, (Ni,Pd)$_2$SbTe, Pd(Sb,Bi)Te, CuPbBiSe$_3$, CuCd$_2$GaSe$_4$, (Cu,Ga)CdSe$_2$, CuCd$_2$InSe$_4$, CuAl$_4$InSe$_8$, CuCdSiSe$_4$, CrCuSnSe$_4$, CuCoGeSe$_4$, Cu$_2$CoSnSe$_4$, CuZn$_2$GaSe$_4$, Cu$_2$FeGeSe$_4$, Cu$_2$FeSiSe$_4$, Cu$_2$FeSnSe$_{3.8-4}$, Cu$_2$MnGeSe$_4$, CuMnSiSe$_4$, CuMnSnSe$_4$, Cu$_2$HgSiSe$_4$, Cu$_2$NiGeSe$_4$, Cu$_3$FeTl$_2$Se$_4$, Cu$_3$Tl$_2$FeSe$_4$, CuZn$_2$InSe$_4$, Cu$_2$ZnSiSe$_4$, Ga$_2$InAsSe$_3$, AgAl$_4$InSe$_8$, PbBi$_2$(Se,Te)$_4$, AlNa$_3$SiTe$_4$, CuCd$_2$GaTe$_4$, CuGd$_2$InTe$_4$, AgCd$_2$InTe$_4$, CuZn$_2$GaTe$_4$, Cu$_3$FeTl$_2$Te$_4$, CuZn$_2$InTe$_4$, PdBi$_2$(Se,Te)$_4$ and AgInAl$_4$Te$_8$.

PREFERRED EMBODIMENTS OF THE INVENTION

Example 1

In order to find the function of an optical recording medium, vapor deposition films were prepared as recording layers. The structure of the optical recording medium was as shown in FIG. 2, and a laser beam was focused on the optical recording medium from the overhead of the substrate. The substrate was quartz glass plate, a rigid glass plate or a polycarbonate (PC) resin disk, each 1.2 mm in thickness. As a protective layer, an inorganic layer of SiO$_2$, AlN, Ta$_2$O$_5$, TiN, Cr$_2$O$_3$, SiN, SiC, GeN, ZrO$_2$, TiO$_2$, ZnS, or SiC was formed on the recording layer by RF sputtering. The thickness of the protective layer was 100 to 500 nm, depending upon the interference conditions of the beam transmitted through the recording layer. The desired (target) compositions of the recording films composed of a single phase of three-component compound thus prepared are shown below: Bi$_2$SeTe$_2$, Ga$_4$GeSe$_8$, Sb$_2$SeTe$_4$, GaGeSe$_3$, Au$_2$SeTe, AgGaSe$_2$, (AuSb)$_2$Te$_3$, Ag$_9$GaSe$_6$ Ge$_2$SeTe, In$_3$SbTe$_2$, Bi$_4$GeTe$_7$, AgInTe$_2$, AgTn$_5$Te$_3$, Ag$_8$GeTe$_6$, CuIn CuInTe$_2$, Cu$_2$GeTe$_3$, Cu$_2$SnTe$_3$, Cu$_3$SbSe$_4$ and AgInSe.

Vapor deposition procedure applicable for forming the single phase of three-component compound includes a single source vapor deposition procedure, a two-source vapor deposition procedure and a three-source vapor deposition procedure as conventional procedures, as shown in the following Table 1.

TABLE 1

| | Vapor deposition procedure | | Analitical results |
|---|---|---|---|
| | vapor source | source combination | |
| conventional | Single source | Single phase of three-component compound | x |
| | Two sources | Two-component alloy and single element | x |
| | Three sources | Three simple elements | x |
| The invention | Two sources | Two-component compound and two-component compound | o |

According to the conventional simple source vapor evaporation procedure, an alloy of the desired composition is prepared in advance, and is subjected to the vapor deposition. According to the conventional two-source vapor deposition procedure, a two-component alloy is prepared in advance and is subjected to vapor deposition as one vapor source together with a simple element as another vapor source to form a single phase of three-component compound. According to the conventional three-source varpor deposition procedure, the three simple elements are subjected to vapor deposition at the same time to form a single phase of three-component compound. On the other hand, the present vapor deposition procedure is a two-source procedure as in the conventional procedure, but a remarkable difference from the conventional two-source vapor deposition procedure using a combination of a two-component alloy as one vapor source and a single element as another source is that a combination of a pair of two-component compounds is used in the present invention. Recording layers each composed of a single phase of the desired three-component compound as listed above were prepared according to the individual vapor deposition procedures and analyzed. The results of analysis are also shown in Table 1, where the cross mark (x) shows a considerable deviation from the desired compound composition and the circle mark (o) shows a substantially desired compound composition. As is apparent from Table 1, all the conventional procedures had the cross mark (x), whereas the present procedure had a good result. This is because the vapor deposition rate is hard to control in the conventional procedures owing to different vapor pressure of the individual elements in the single phase of three-component compound composition. Particularly, selenium and tellurium have unstable vapor deposition rates and the vapor deposition must be repeated more than 10 times to obtain the desired compound composition, and this is a serious problem in the productivity. In the present vapor deposition procedure, on the other hand, the vapor-sources are compounds themselves, which are very stable and have a larger bounding force. Thus, the desired compound composition can be obtained by one vapor deposition and the productivity is incomparably higher than that of the conventional procedures.

Example 2

Table 2 shows analytical results of films prepared as a recording layer from a single phase, three-component compound, CuInTe$_2$, according to the conventional vapor deposition procedures and the present vapor deposition procedure.

TABLE 2

| CuInTe$_2$(Cu$_{25}$In$_{25}$Te$_{50}$% by atom) | | | | |
|---|---|---|---|---|
| Vapor deposition procedure | | Analysis (% by atom) | | |
| Vapor source | Vapor source materials | Cu | In | Te |
| Conventional Single source | Cu$_{25}$In$_{25}$Te$_{50}$ | 5.2 | 10.2 | 84.6 |
| Two sources | CuIn:Te = 1:1 | 7.0 | 14.5 | 78.5 |
| Three sources | Cu:In:Te = 1:1:2 | 9.8 | 8.0 | 82.2 |
| The invention Two sources | InTe:CuTe = 1:1 | 23.2 | 26.4 | 50.4 |

Cu$_{25}$In$_{25}$Te$_{50}$ (in % by atom) as a vapor source matirial for the conventional single source vapor deposition procedure was melted and alloyed in a Siliconit furnace and used as the vapor source. In the case of the conventional two-source vapor deposition procedure, Cu$_{50}$In$_{50}$ was melted and alloyed in the Siliconit furnace and used together with Te as vapor sources, where vapor deposition rates of Cu$_{50}$In$_{50}$ and Te were measured, respectively, in advance and vapor deposition was carried out in a ratio of CuIn:Te=1:1. In the case of the conventional three-source vapor deposition procedure, three elements, Cu, In and Te, were used, where vapor deposition rates of Cu, In and Te were measured, respectively, in advance and vapor deposition was carried out in an ratio of Cu:In:Te=1:1:2. In the present invention, on the other hand, two-component compounds, InTe and CuTe, were melted and alloyed in the Siliconit furnace, respectively, and then pulverized. The thus obtained two powdery compounds were used as vapor sources to form a film composed of a single pahse of three-component compound.

The individual vapor sources were placed on tungsten or molybdenum boats in a vapor deposition chamber, respectively, and the vapor deposition chamber was evacuated to a vacuum degree of $5 \times 10^{-6}$ Torr and then the vapor sources were subjected to vapor deposition each to form a vapor deposition film on a substrate to a film thickness of 80 to 120 nm. The thus obtained films were subjected to ICP analysis. As is apparent from the analytical results of Table 2, no desired compositions were obtained in the conventional procedures, whereas the film obtained by simultaneous vapor deposition of the two-component compounds, InTe and CuTe, according to the present invention had a substantially desired composition.

As a vapor deposition chamber for the present invention, a two-source resistance-heating vapor deposition chamber was used.

Example 3

Table 3 shows analytical results of films composed of a single phase of three-component compound, $In_3SbTe_2$, prepared according to the conventoinal vapor deposition procedures and the present vapor deposition procedure under the same preparation conditions as in Example 2. As is apparent from the analytical results of Table 3, the present vapor deposition procedure was distinguished in obtaining a film of desired composition, as in Example 2.

TABLE 3

$In_3SbTe_2(In_{50}Sb_{17}Te_{33}$ in % by atom)

| | Vapor deposition procedure | | Analysis (% by atom) | | |
|---|---|---|---|---|---|
| | Vapor source | Vapor deposition materials | In | Sb | Te |
| Conventional | Single source | $In_{50}Sb_{17}Te_{33}$ | 20.2 | 34.8 | 45.0 |
| | Two sources | SbTe:In 1:1 | 34.5 | 12.5 | 53.0 |
| | Three sources | In:Sb:Te 2:1:1 | 42:5 | 27.5 | 30.0 |
| The invention | Two sources | InSb:InTe 1:2 | 48.2 | 16.5 | 35.3 |

Figure 8A:
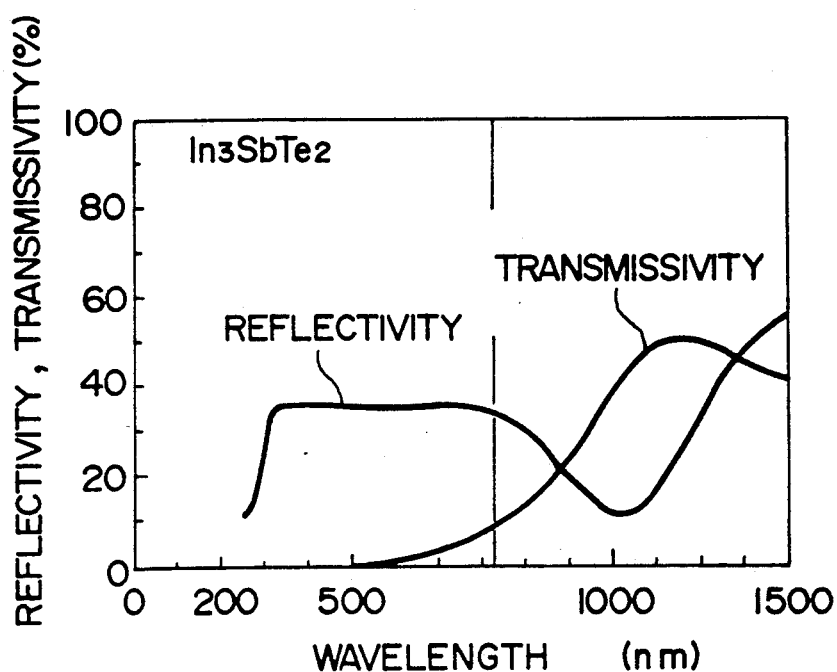
FIGS. 8a and 8b are optical characteristic diagrams of $In_3SbTe_2$.
Figure 8B:
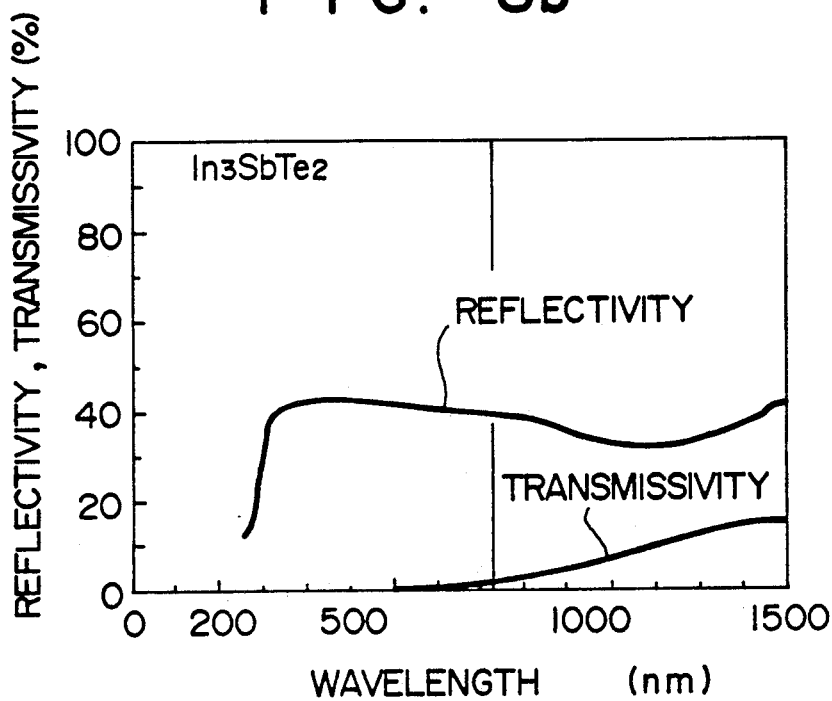

Optical characteristics of $In_3SbTe_2$ are shown in FIGS. 8a and 8b. FIG. 8a shows spectroscopic characteristics of an optical recording medium having a film prepared in the same manner as above as a recording layer and a protective film of $SiO_2$ having a thickness of 100 nm, formed on the recording layer. FIG. 8b spectroscopic characteristics of the same optical recording medium as above, heated up to 350° C., kept at that temperature for 5 minutes and then slowly cooled. At the semiconductor laser wavelength of 830 nm, the reflectivity was increased to 40% from 34% and the transmissivity was decreased to 1% from 8% by the heat treatment. This shows that the optical characteristics were greatly changed by a phase change from the amorphous state to the crystalline state.

Figure 9:
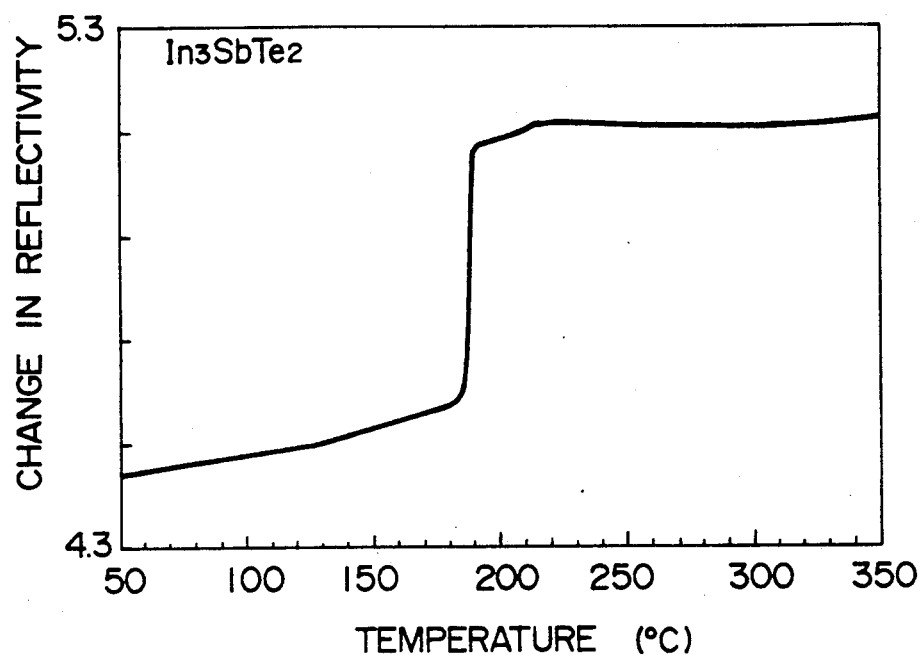
FIG. 9 is a characteristic diagram showing changes in reflectivity by heating $In_3SbTe_2$.

FIG. 9 shows measurement results of dynamic change in the reflectivity by heating, where the reflectivity abruptly increased at 188° C. This shows that the present optical recording medium can undergo high speed erasing. The film prepared according to the present vapor deposition procedure had a analytical composition of $In_{51}Sb_{17}Te_{32}$ (in % by atom) and it seems that a single phase of three-component compound, $In_3Sb-Te_2$, was formed. According to the phase diagram of pseudobinary system of InTe-InSb, the melting point at a metastable state of $In_3SbTe_2$ is 568° C. and the single phase dominates just up to the melting point. Thus, at the recording, an amorphous state can be obtained by heating to higher than the single melting point, followed by quenching. Since the melting point of a single phase compound is substantially single, the single phase compound will melt at a definite temperature at that time, and thus the high speed recording can be made. Furthermore, since the single phase of three-component compound can dominate against heating just up to the melting point, a phase change from the amorphous state to the crystalline state can be made at the erasing by heating just up to the melting point from the crystallization temperature without phase separation. Since the crystallization is 188° C., as seen from FIG. 9, superheating by 380° C. can be obtained. The absence of phase separation unnecessitates a long distance diffusion and thus high speed erasing can be made.

Example 4

An In-Te-Sb film was formed on a transparent glass substrate or a polycarbonate substrate to a film thickness of 100 mm by DC magnetron sputtering. The sputtering target was prepared by melting in an Ar atmosphere. The sputtering conditions were an output power of 100 W, an initial vacuum degree of $8.5 \times 10^{-5}$ Pa, an Ar partial pressure of 20 m Torr with water cooling of the substrate. The thus formed In-Te-Sb film was found by analysis to have a composition of $In_{49}Sb_{20}Te_{31}$ (in % by atom), which was substantially identical with the composition of the compound obtained by vapor deposition. Thus, the spectroscopic characteristics and crystallization temperature were substantially identical with those of the vapor deposited film, and the same reproducibility as that of the vapor deposited film was obtained.

Figure 10:
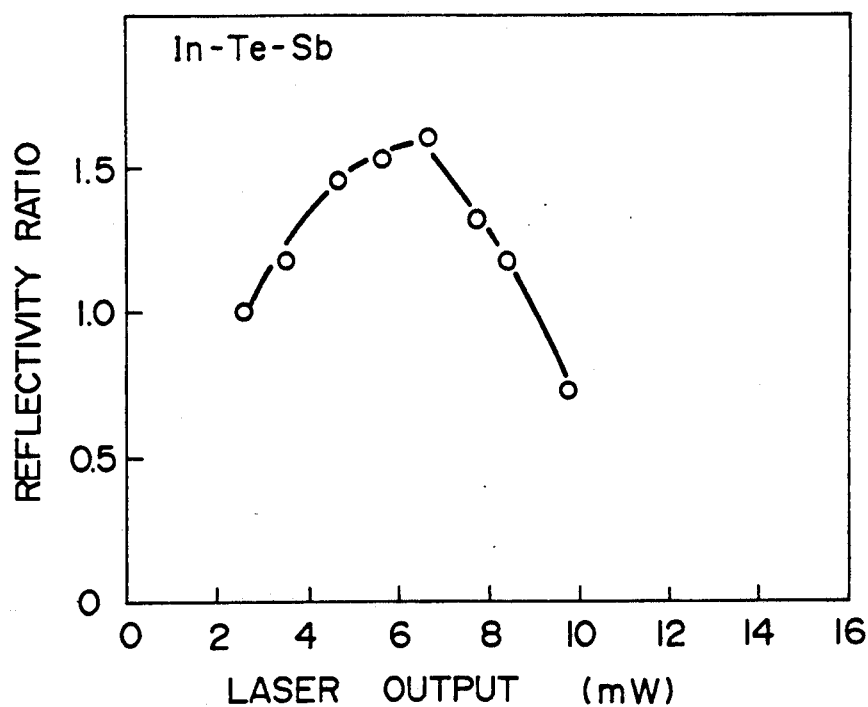
FIG. 10 is a characteristic diagram showing a relationship between the reflectivity ratio and the laser output of an optical recording medium containing an In-Te-Sb film.

FIG. 10 shows recording and erasing characteristics of an optical recording medium having the sputtering film prepared in the same manner as above as a recording layer and a Si02 film having a thickness of 100 nm, formed in the same manner as in Example 1, where the initial state is an amorphous state and the reflectivity ratio increases by increasing the laser output power from 2 mW to 4 mW and further to 6 mW. This increase in the reflectivity ratio means a contribution to a phase change from the amorphous state to the crystalline state. With further increase of the laser output power to 7 mW or higher, the recording is initiated, and the reflectivity ratio starts to decrease.

Figure 11A:
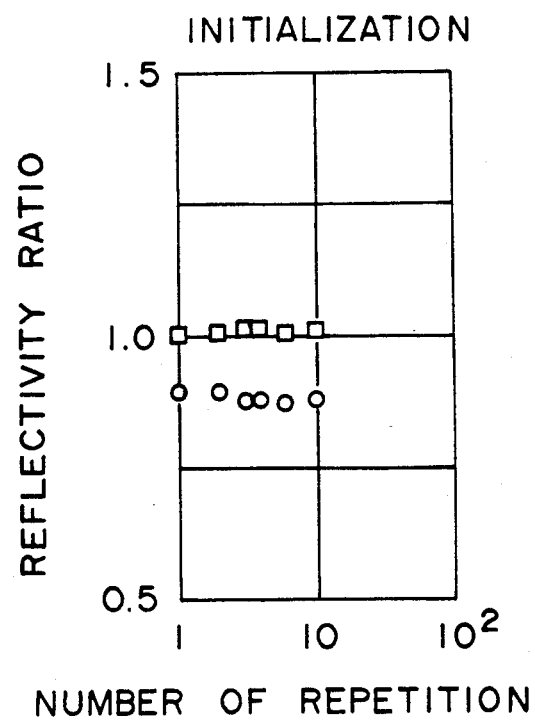
FIGS. 11a and 11b are characteristics diagrams showing test results of repetitions of recording and erasing of an optical recording medium containing an In-Te-Sb film.
Figure 11B:
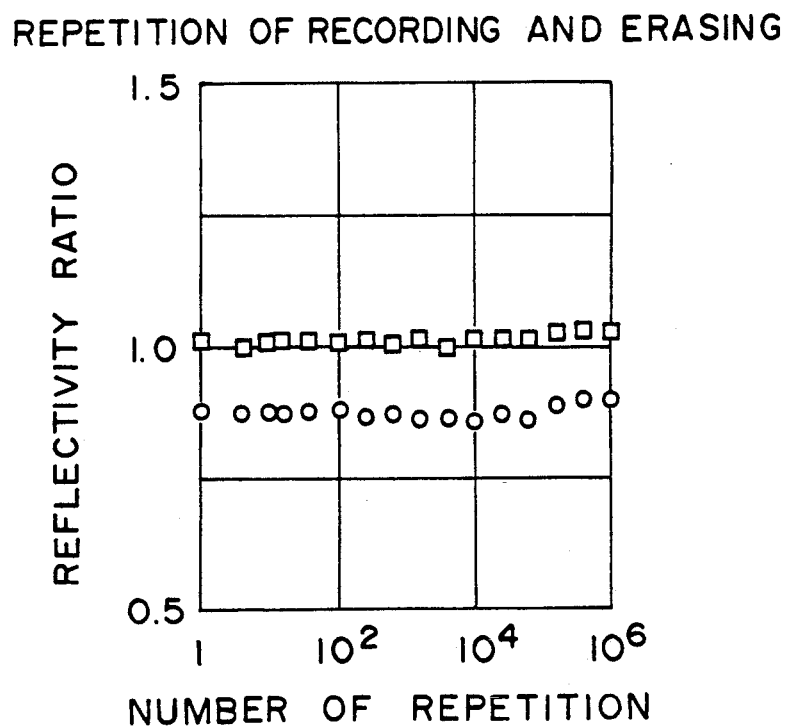

FIGS. 11a and 11b show results of repetitions of recording and erasing of the present recording medium, that is, the results obtained by repeating recording and erasing 10 times as the initialization, thereby stabilizing the optical recording medium and then by making $10^6$ repetitions of recording and erasing under the recording conditions of laser output power of 13 mW and pulse width of 0.02 μm and the erasing conditions of 8 mW and and 0.03 μs, where the average contrast was 18% at the repetition test. Thus, the present optical recording medium can overwrite for 0.03 μm, that is, can erase the recorded information for 0.03 μm and record new information at the same speed. The contrast is still as small as 18% in this test, but can be increased to about 25% by optimizing the film thicknesses of the recording layer and the protective layer and the materials of the protective layer.

Figure 12:
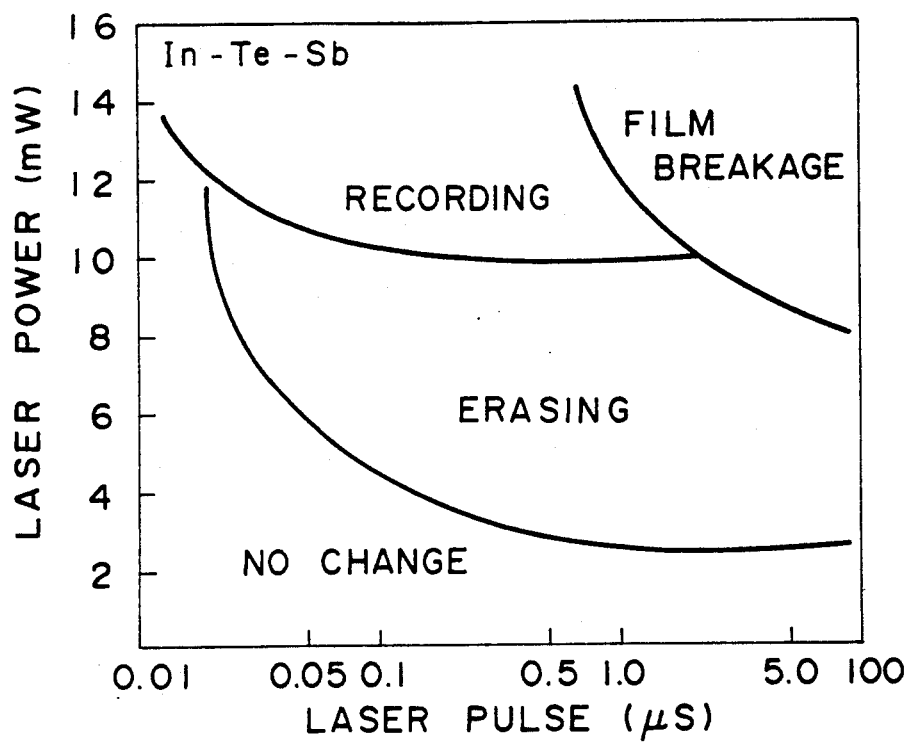
FIG. 12 is a characteristic diagram of an optical recording medium having an In-Te-Sb film.

FIG. 12 shows a characteristic map of the present optical recording medium. The present optical recording medium can undergo high speed recording and erasing because a recording layer composed of a single phase of three-component compound is subjected to recording just above the melting point and to erasing just below the melting point. The present optical recording medium has a broad erasing region as a characteristic. There is a film breakage region, which is, however, at the long pulse side. Thus, the film breakage hardly occurs even at a high laser output power and much higher speed recording and erasing can be made with a laser of higher output power.

Example 5

Figure 13:
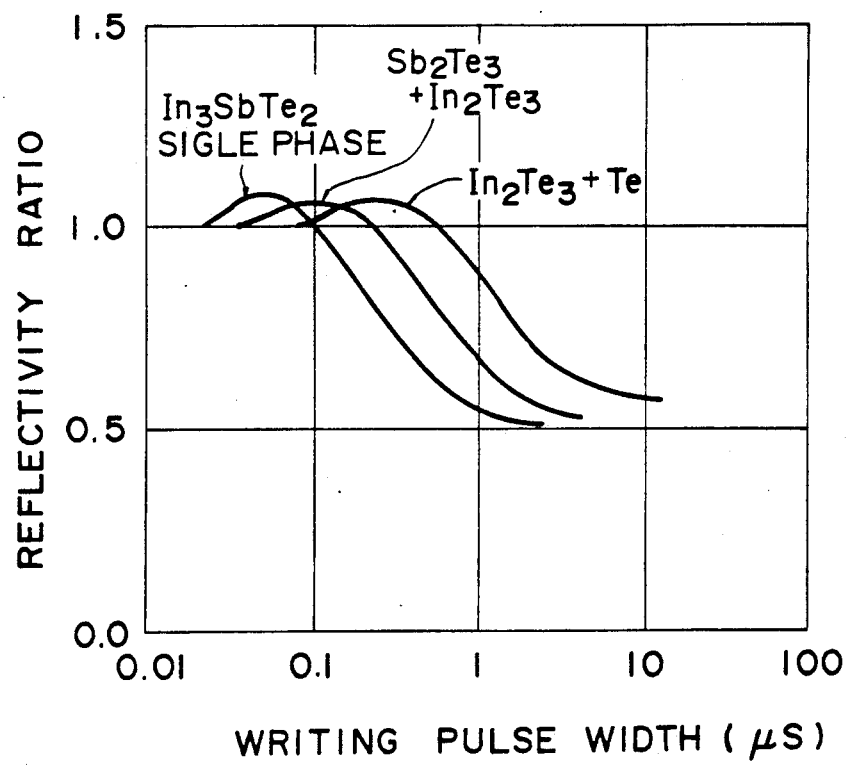
FIG. 13 is a characteristic diagram showing differences in recording characteristics due to differences in materials of recording layer.

FIG. 13 shows static state recording test results of optical recording media having a recording layer of In-Te-Sb system, that is, $In_{50}Sb_{15}Te_{35}$, a composition that precipitates a (111) $In_3SbTe_2$ in a single phase at the crystallization; $In_{17}Sb_{48}Te_{35}$, a composition that precipitate a (112) compounds in two phases, $In_{20}Sb_{15}Te_{65}$, a composition that precipitates (113) Te in a single phase. The recording conditions were that the pulse width was gradually made longer at the laser output power of 12 mW. The initial states were just the same states as the films were formed and were each identified to be amorphous states. In all the compositions, the reflectivity increased at first by crystallization and melting started by making the pulse width larger, thereby effecting partial heating to a temperature over the melting point. That is, the recording layer was brought into a recording state, whereby the reflectivity was decreased. It was found by comparing the results of the three compositions that the composition that precipitates the 111 $In_3SbTe$ in a single phase had the highest erasing and recording speeds, the composition that precipitate the compounds in two phases had the next highest speeds and the composition that precipitates Te in a single phase had the lowest speeds. That is, the single phase region of three-component compound had the best recording and erasing characteristics.

Example 6

Table 4 shows the results of durability tests of the compositions given in the Table 4 at a temperature of 40° C. and a humidity of 90% for 10 days. Test pieces were optical recording media each having a recording layer composed of one of the compositions and formed to a thickness of 100 nm on a glass substrate and a protective film of $SiO_2$ formed to a thickness of 100 nm on the recording layer and having been subjected to pulse recording with 12 mW and 0.5 μs.

TABLE 4

| Crystalline phase identified by X-rays | Durability test at constant temperature of 40° C. and humidity of 90% for 10 days |
| --- | --- |
| Single phase composition of $In_3SbTe_2$ | No change |
| $In_3SbTe_2 + In_3Te_3$ ($In_3SbTe_2$: 80%) | No change |
| $In_2Te_2 + Te$ | Considerable change |

The single phase composition of $In_3SbTe_2$ and a double phase composition of $In_3SbTe_2+In_2Te_3$ (the content of $In_3SbTe_2$ is 80%) had no change, whereas the composition that precipitates $In_2Te_3+Te$ had a change in the recording layer and had a higher transmissivity and it was found by microscopic observation that its recorded signal was obscure, because it seems that Te was changed to $TeO_x$. So far as Te exists as a stable compound, it is saturated with divalent bonds and never undergoes oxidation even in an oxidizing atmosphere, whereas when Te is precipitated as a simple substance, it undergoes a phase change from the amorphous state to the crystalline state even at room temperature or it is oxidized to $TeO_x$. Thus, the recording layer is deficient in stability. In other words, it is very important to use a recording layer having a composition range that never precipitates an elemental simple substance at the crystallization.

Example 7

Figure 14:
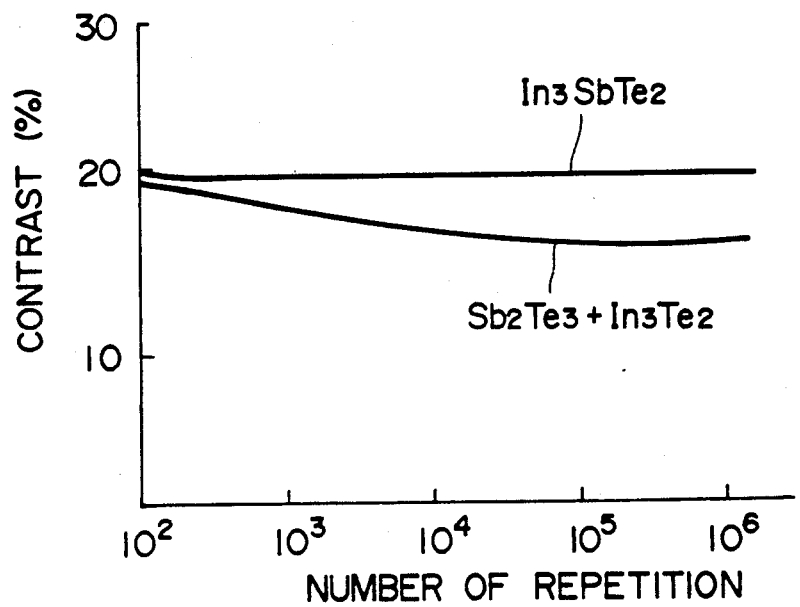
FIG. 14 is a characteristic diagram showing a relationship between the number of repetitions of recording and erasing and the contrast.
Figure 15:
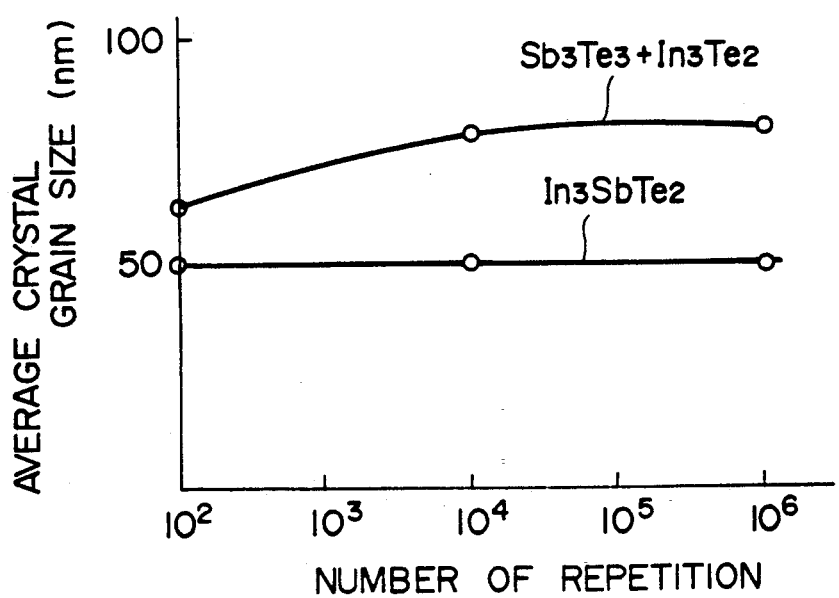
FIG. 15 is a characteristic diagram showing a relationship between the number of repetitions of recording and erasing and the average crystal grain size of the recording layer.

FIGS. 14 and 15 show relationships between the contrast and the average crystal grain size when recording and erasing are repeated, where repetition characteristics of single phase, three-component composition of a three-component compound $In_3SbTe$ and two-phase, three-component composition of two-component compounds $Sb_2Te_3+In_2Te_3$ are given. The single phase, three-component composition had no change in the contrast after $10^6$ repetitions of recording and erasing, whereas the contrast of the two-phase, three-component composition of $Sb_2Te_3+In_2Te_3$ was about 20% lowered after $16^6$ repetitions.

FIG. 15 shows the average crystal grain sizes after $10^2$ repetitions, $10^4$ repetitions and $10^6$ repetitions. The single phase, three-component composition of a three-component compound had substantially equal crystal grain sizes throughout all the repetitions, whereas the crystal grain sizes of the two-phase, three-component composition that precipitates two-component compounds in two phases had a tendency to become larger with increasing number of repetitions. This is because, when two two-component compounds having different surface energies are formed in two phases, the surface energies will be higher than at the crystal grain boundaries of the same species compounds themselves and thus a change takes place in such a direction as to reduce the surface area. That is, the repetition characteristics of the two-phase, three-component composition that precipitates two-component compounds in two phases are not better than those of the single phase composition of three-component compound.

Example 8

The Sb-Ge-Te system has three three-component compounds, $GeSb_4Te_7$, $GeSb_2Te_4$ and $Ge_2Sb_2Te_5$. A film of particularly $Ge_2Sb_2Te_5$ was prepared by vapor deposition. As vapor sources, one comprising grains of GeTe and another comprising grains of $Sb_2Te_3$ were prepared by melting and subjected to two-source vapor deposition at an initial vacuum degree of $3\times10^{-6}$ Torr with water cooling of the substrate to make the film as a recording layer on the substrate. Then, a protective layer of $SiO_2$ was formed on the recording layer to a thickness of 100 nm to obtain an optical recording medium.

Figure 16:
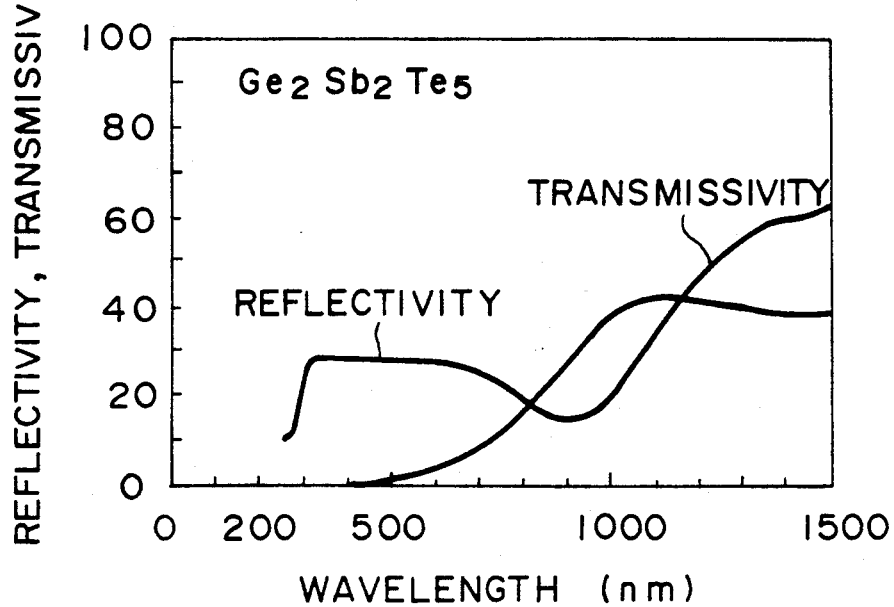
FIG. 16 is an optical characteristic diagram of $Ge_2Sb_2Te_5$.

FIG. 16 shows optical characteristics of the film of $Ge_2Sb_2Te_5$ just as vapor deposited, where the reflectivity is 17.1%, the transmissivity 19.8% and the absorbance 63.1% at a wavelength of 830 nm.

Figure 17:
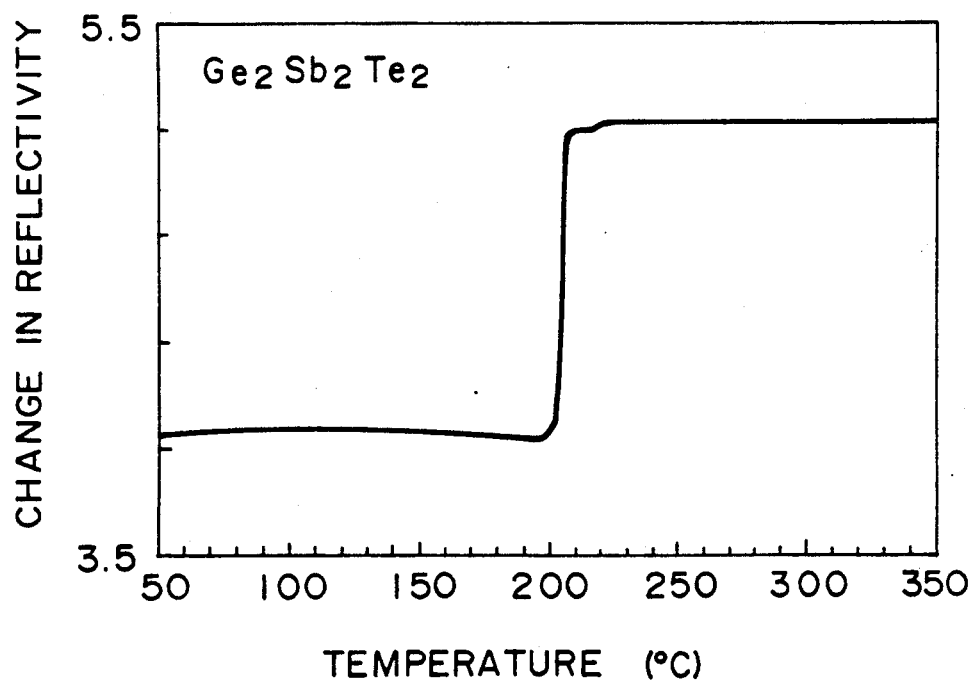
FIG. 17 is a characteristic diagram showing changes in reflectivity by heating $Ge_2Sb_2Te_5$.

FIG. 17 shows changes in the reflectivity when the optical recording medium was heated at a temperature increase rate of 20° C./min, where the reflectivity takes a sharp rise at 202° C., showing a possibility of high speed erasing.

Example 9

The Sb-Se-Te system has a three-component compound of $Sb_{40}Se_{20}Te_{40}$. This composition was formed on a substrate by vapor deposition. As vapor sources, $Sb_2Te_3$ and $Sb_2Se$ were prepared by melting and subjected to two-source vapor deposition at an initial vacuum degree of $3\times10^{-6}$ Torr with water cooling of the substrate to form the film as a recording layer on the substrate. Then, a protective layer of $SiO_2$ was formed on the recording layer to a thickness of 100 nm to obtain an optical recording medium.

Figure 18:
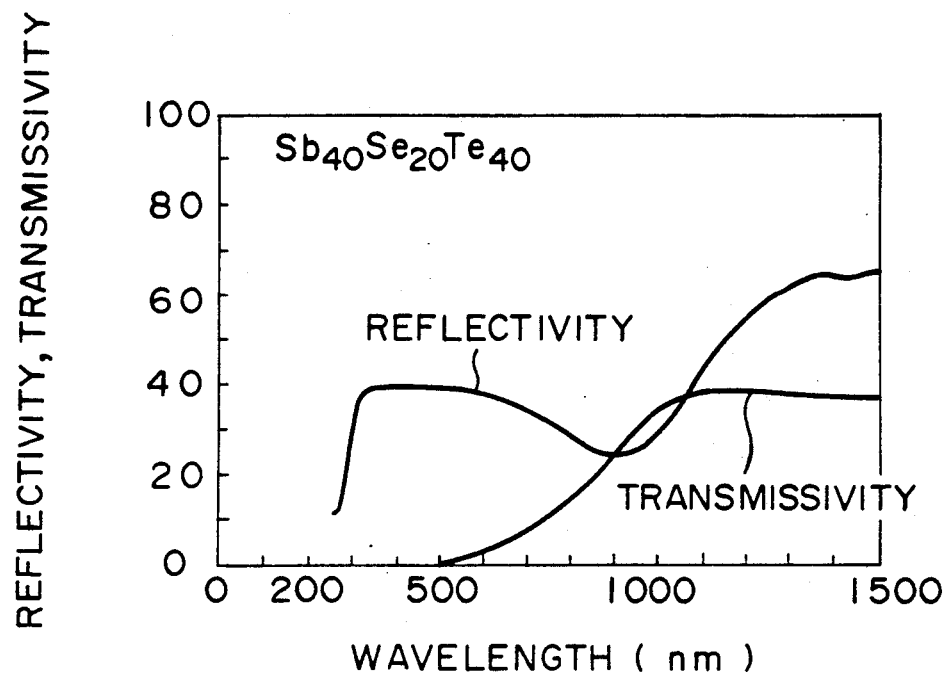
FIG. 18 is an optical characteristic diagram of $Sb_{40}Se_{20}Te_{40}$.

FIG. 18 shows optical characteristics of the film of $Sb_{40}Se_{20}Te_{40}$ just as vapor deposited, where the reflectivity is 26.0%, the transmissivity 17.3% and the absorbance 56.7% at a wavelength of 830 nm.

Figure 19:
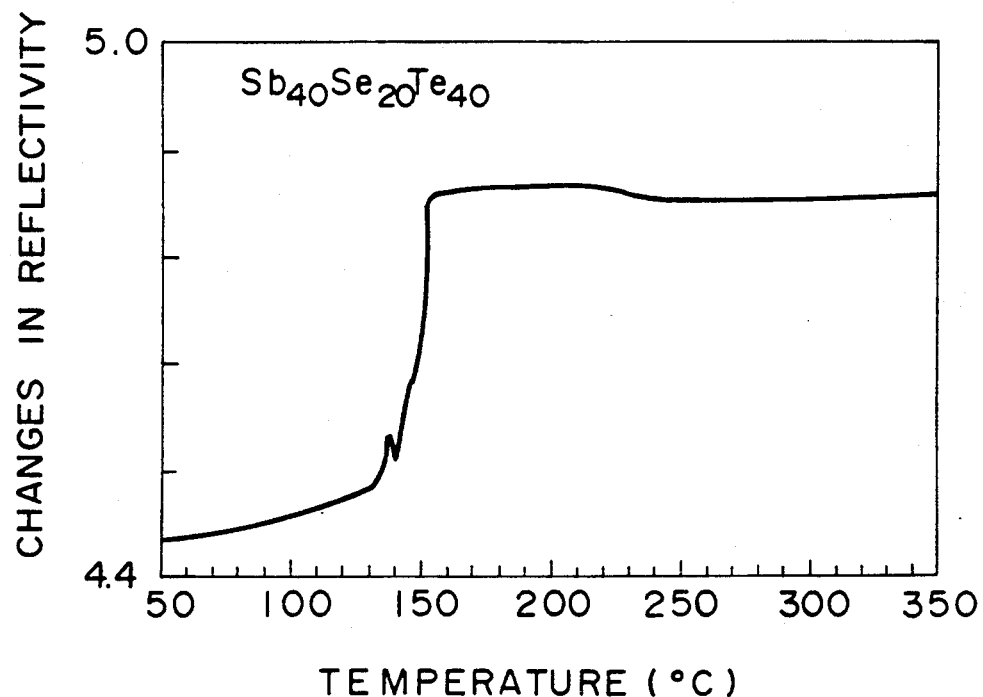
FIG. 19 is a characteristic diagram showing changes in reflectivity by heating $Sb_{40}Se_{20}Te_{40}$.

FIG. 19 shows changes in the reflectivity when the optical recording medium was heated at a temperature increase rate of 20° C./min, where the reflectivity takes a sharp rise at 140° C., which contributes to a phase change from tha amorphous state to the crystalline state. It can be seen therefrom that the crystallization takes place within a very narrow temperature range and thus the single phase composition of the three-component compound can perform high speed erasing.

Example 10

The Bi-Se-Te system has a three-component compound of $Bi_{40}Se_{20}Te_{40}$. A film of the composition was formed as a recording layer on a substrate by vapor deposition. As vapor sources $Bi_2Te_3$ and SiSe were prepared by melting and subjected to two-source vapor deposition at an initial vacuum degree of $3\times10^{-6}$ Torr with water cooling of the substrate to form the film. Then, a protective film of $SiO_2$ was formed on the recording layer to a thickness of 100 nm to obtain an optical recording medium.

Figure 20:
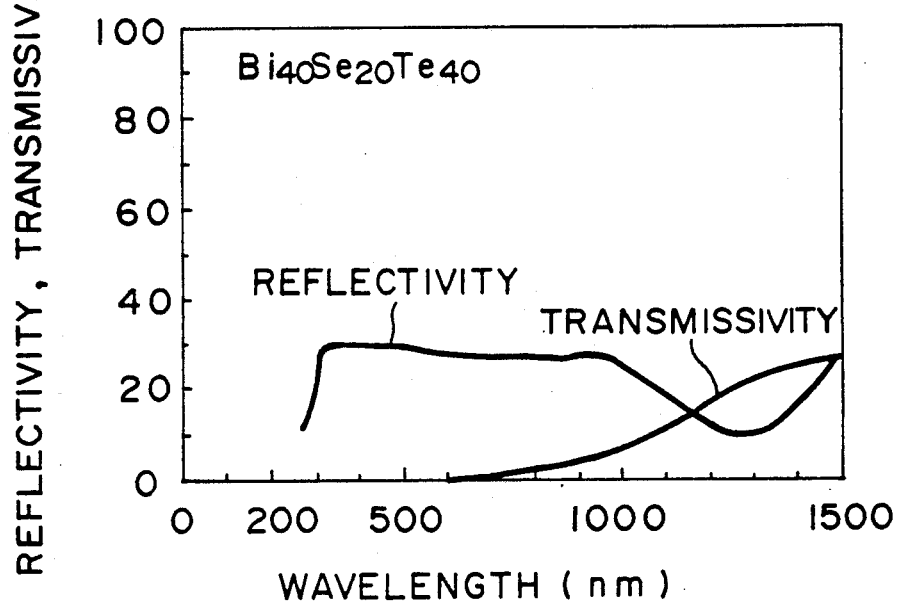
FIG. 20 is an optical characteristic diagram of $Bi_{40}Se_{20}Te_{40}$.

FIG. 20 shows optical characteristics of the film of Bi $Se_{20}Te_{40}$ just as vapor deposited, where the reflectivity is 27.0%, the transmissivity 2.3% and the absorbance 70.7 at a wavelength of 830 nm.

Figure 21:
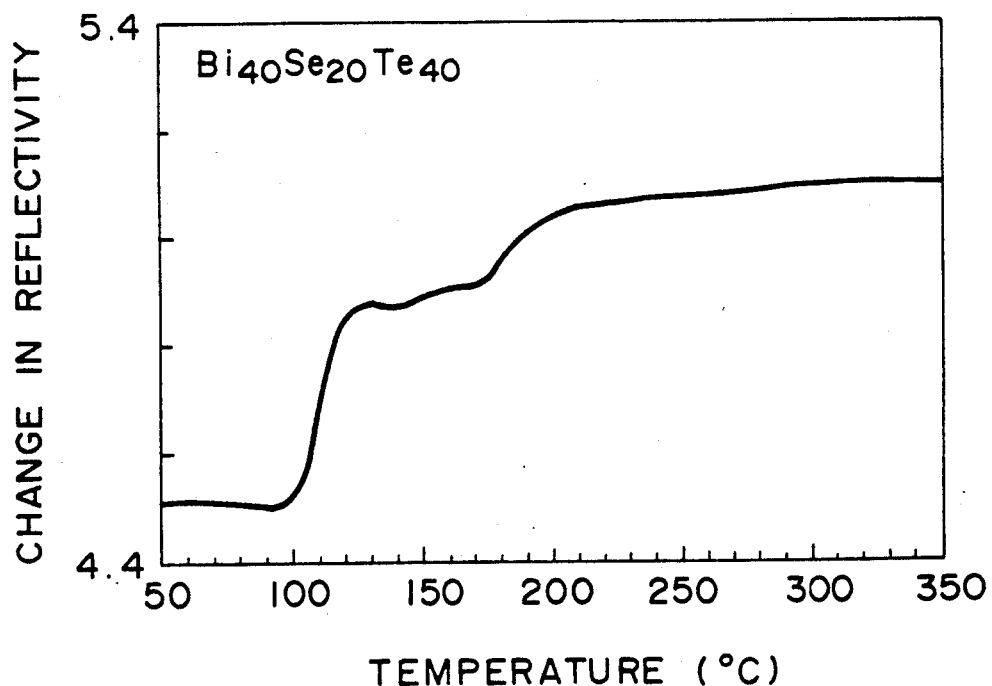
FIG. 21 is a characteristic diagram showing changes in reflectivity by heating $Bi_{40}Se_{20}Te_{40}$.

FIG. 21 shows changes in the reflectivity when the optical recording medium was heated at a temperature increase rate of 20° C./min, where the reflectivity takes a sharp rise at 118° C., which contributes to a phase change from the amorphous state to the crystalline state. It can be seen therefrom that the crystallization takes place within a very narrow temperature range and thus the single phase composition of the three-component compound can perform high speed erasing.

Example 11

Table 5 shows analytical results of films of single phase, three-component compound, $AgSbTe_2$, prepared according to the conventional vapor deposition procedures and the present vapor deposition procedure in the same manner as in Example 2. The desired composition was not obtained according to the conventional procedures whereas the substantially satisfactory composition as desired was obtained according to the present invention.

TABLE 5

| | AgSbTe₂(Ag₂₅Sb₂₅Te₅₀ in % by atom) | | | | |
|---|---|---|---|---|---|
| | Vapor deposition procedure | | Analysis (% by atom) | | |
| | Vapor sources | Vapor deposition materials | Ag | Sb | Te |
| The conventional procedure | Single source | Ag₂₅Sb₂₅Te₅₀ | 12.2 | 30.8 | 57.0 |
| | Two sources | AgSb:Te 1:1 | 12.0 | 24.6 | 63.4 |
| | Three sources | Ag:Sb:Te 1:1:2 | 42.5 | 22.5 | 35.0 |
| The invention | Two sources | Sb₂Te₃:Ag₂Te₂ 1:1 | 23.0 | 24.2 | 52.8 |

Example 12

A film of $CuZn_2InT_4$ as an example of single phase, four-component compound was formed on a substrate in a DC magnetron sputtering chamber. The sputtering target was prepared by melting in an Ar atmosphere at an output power of 100 W, an initial vacuum degree of $8.5\times10^{-5}$ Torr and an Ar partial pressure of 20 m Torr with water cooling of the substrate. This alloy film can be likewise formed also by vacuum vapor deposition.

Figure 22:
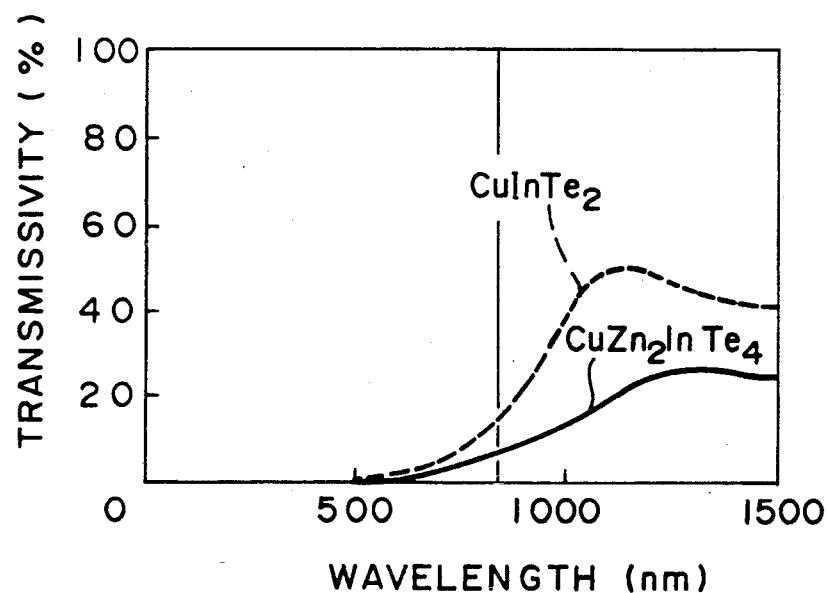
FIG. 22 is a characteristic diagram showing a relationship between the wavelength and the light transmissivity of optical recording media having a crystalline state of a single phase of a four-component compound.

FIG. 22 shows an example of adding Zn for improving the light absorption to $CuInTe_2$ to make $CuZn_2InTe_4$, whereby the transmissivity at a semiconductor laser wavelength of 830 nm was reduced to 9% from 18% at equal thicknesses of 100 nm, and thus the absorbance was increased. The power of semiconductor laser on the film surface on the substrate that can be output up to now is about 15 mW and thus the recording speed can be increased by efficient absorption of the laser beam with such power.

Figure 23:
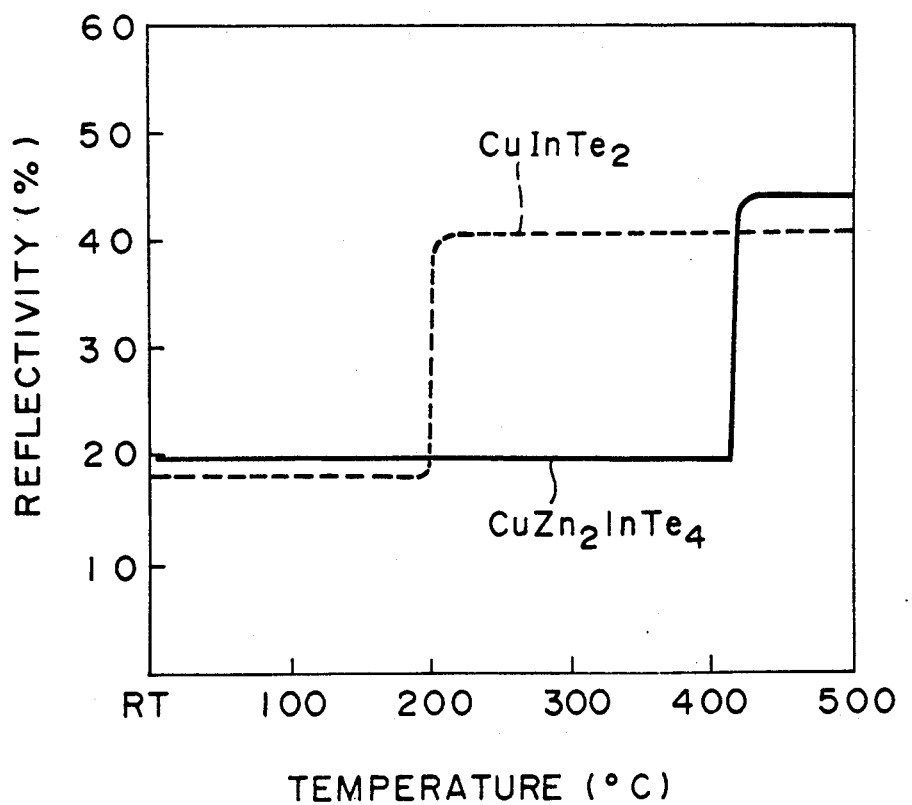
FIG. 23 is a characteristic diagram showing a relationship between the wavelength and the spectroreflectivity of optical recording media having a crystalline state of a single phase of a four-component compound.

FIG. 23 shows changes in the reflectivity when an optical recording medium having a recording layer of $CuInTe_2$ and that having a recording layer of $CuZn_2InTe_4$ were heated. By adding Zn to $CuInTe_2$, the crystallization temperature due to changes in the reflectivity was increased from 200° C. to 420° C., though the reflectivity at room temperature was substantially the same therebetween. Such a high crystallization temperature shows that the stability of amorphous state is high at room temperature.

Figure 24:
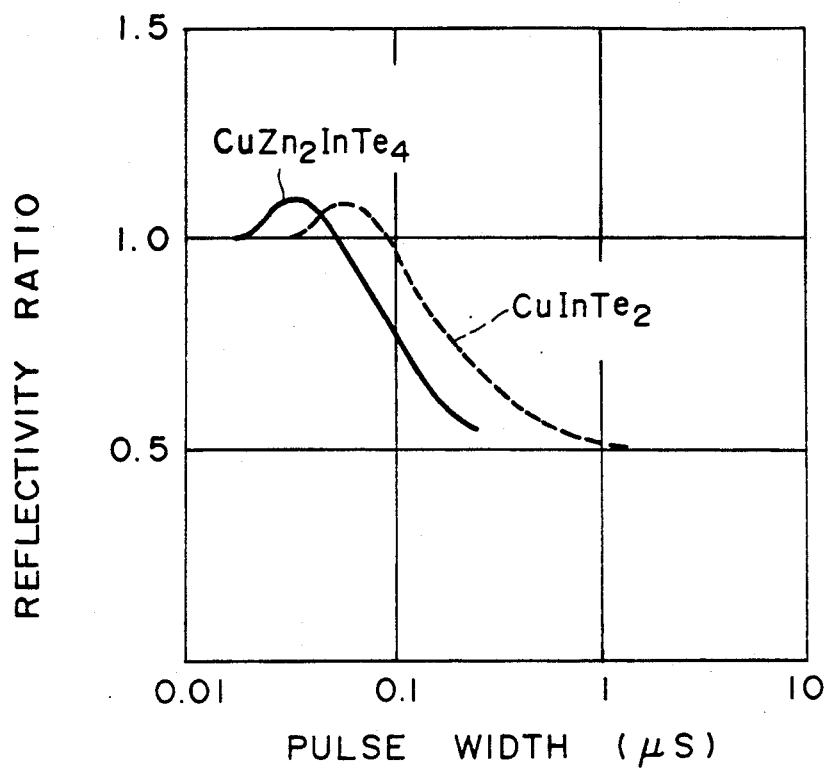
FIG. 24 is a characteristic diagram showing a relationship between the reflectivity ratio and the pulse width of optical recording media having a recording layer of $CuZn_2InTe_4$ and $CuInTe_2$, respectively.

FIG. 24 shows a reflectivity ratio when an optical recording medium having a recording layer of $CuInTe_2$ and that having a recording layer of $CuZn_2InTe_4$ were exposed to a laser pulse of 10 mW. By irradiation of short pulse onto the recording layer in an amorphous state, the crystallization took place, thereby increasing the reflectivity ratio. $CuZn_2InTe_4$ had a higher crystallization temperature than that of $CuInTe_2$, and thus was not crystallized unless irradiated with a relatively strong laser of 12 mW, but its crystallization speed was much accelerated. That is, high speed erasing was possible. Most of so far available recording layer materials can undergo erasing with a weak laser beam but the erasing speed is low. On the other hand, the present recording layer materials have a high crystallization temperature and high speed erasing can be made with a relatively strong laser beam.

Figure 25:
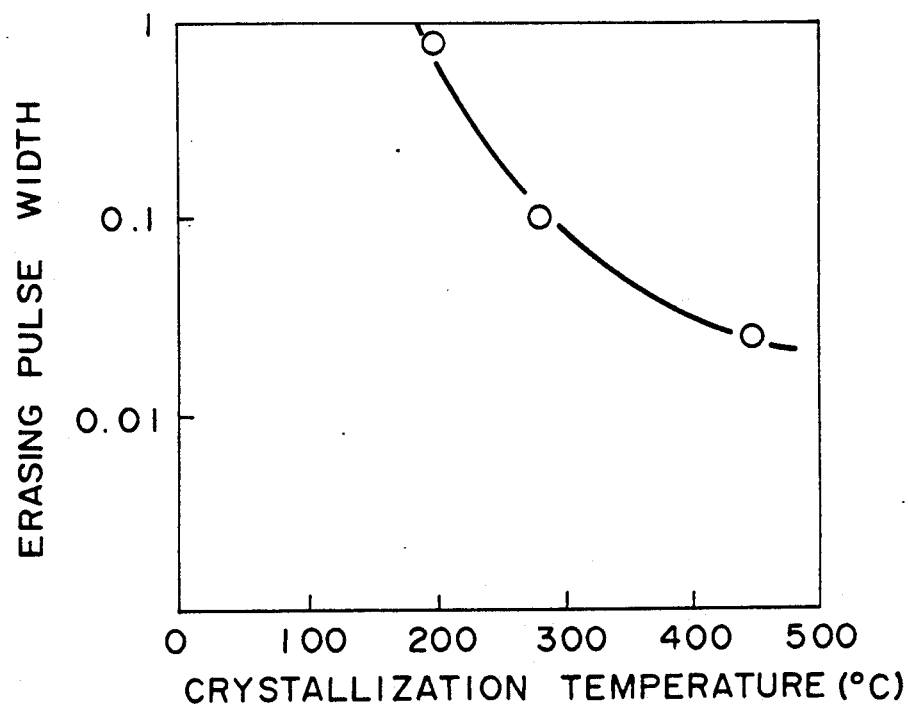
FIG. 25 is a characteristic diagram showing a relationship between the erasing pulse width and the crystallization temperature.

FIG. 25 shows erasing pulse width obtained for recording layers having different crystallization temperatures from the results of FIG. 24, where a single phase, four-component compound having the highest crystallization temperature has the shortest erasing pulse width and thus can undergo the fastest erasing. The foregoing characteristics can be obtained with compound composition comprising 10 to 15% of Cu, 20 to 30% of Zn and 8 to 17% of In, the balance being Te and containing a single phase, four-component compound as the main component.

FIGS. 26a and 26b show repetition characteristics of an optical recording medium having a recording layer of $CuZn_2InTe_4$, where distinguished repetition characteristics can be obtained owing to the single phase, 4-component compound without any fear of phase separation.

Example 13

A film of a three-component compound having a composition of $Bi_{15}Ge_{30}Te_{55}$ was formed as a recording layer on a quartz glass substrate to a thickness of 1.2 mm by sputtering and then a surface protective layer of $SiO_2$ was formed on the recording layer to obtain an optical recording medium. The alloy film of Bi-Te-Ge three-component compound was formed by DC magnetron sputtering. The sputtering target was prepared in an Ar atmosphere by melting. The sputtering conditions were an output power of 100 W, an initial vacuum degree of $8.5 \times 10^{-5}$ Pa and an Ar partial pressure of 20 m Torr with water cooling of the substrate. The thus formed Bi-Ge-Te film was analyzed and formed to be $Bi_{15}Ge_{30}Te_{55}$, whereby a compound of substantially desired composition was obtained.

FIGS. 27 and 28 show optical characteristics of the thus prepared optical recording media.

FIG. 27 shows spectroscopic characteristics of an optical recording medium having a protective layer of $SiO_2$ having a thickness of 100 nm.

FIG. 28 shows spectroscopic characteristics of the same optical recording medium as above, further heated to 350° C., kept at that temperature for 5 minutes and then slowly cooled. It is apparent therefrom that by the heat treatment, the reflectivity is increased from 30% to 50% at a semiconductor laser wavelength of 830 nm, whereas the transmissivity was reduced to 3% from 10%. This shows that the optical characteristics are greatly changed with a phase change from the amorphous state to the crystalline state.

As a result of measuring changes in the reflectivity by heating it has been found that the reflectivity abruptly increases at about 200° C. This shows that the present optical recording medium can undergo high speed erasing. The melting point of the composition approximating to $Bi_2Ge_3Te_6$ is about 650° C., and the single phase dominates just up to the melting point. That is, at the recording, an amorphous state is brought about by heating to a temperature higher than the single melting point, followed by quenching. So long as the single phase compound dominates at that time, the compound melts at a definite temperature because of substantially single melting point, and thus high speed recording can be carried out. Furthermore, heating can be made just up to the melting point as the single phase, three-component compound, and thus at the erasing a phase change from the amorphous state to the crystalline state can be made by heating from the crystallization temperature Tx just up to the melting point without any phase separation. Since the crystallization temperature is about 200° C., superheating by 450° C. can be obtained. The absence of phase separation unnecessitates a long distance diffusion and thus high speed erasing can be made.

Example 14

FIG. 29 shows results of static state recording characteristics of optical recording media each having a recording layer of Bi-Ge-Te system, that is, a recording layer having a composition that precipitates a single phase, three-component compound of $Bi_2Ge_3Te_6$ at the crystallization, that having a composition that precipitates two-component compounds in two phases or a two-component and a three-component compound in two phases, and that having a composition that precipitates simple element subtance Te. The recording conditions were that the pulse width was gradually made larger at the laser output power of 12 mW. The initial states were just the same states as the films were formed and were each identified to be amorphous states. In all the compositions, the reflectivity increased at first by crystalliation and melting started by making the pulse width larger, thereby effecting partial heatingt to a temperature over the melting point. That is, the recording layer was brought into a recording state, whereby the reflectivity was decreased. It was found byc omparing the results of the three composition that the composition that precipitates $Bi_2Ge_3Te_6$ in a single phase had the highest erasing and recording speeds, the composition that precipitates the compounds in two phases had the next highest speeds and the composition that precipitates the single constituent element Te had the lowest speeds. That is, it can be seen therefrom that the present single-phase region of three-component compound has the best recording and erasing characteristics.

FIG. 30 shows the contrast when the recording and erasing were repeated.

FIG. 31 shows the average crystal grain size.

In the single phase composition of three-component compound had no change in the contrast after $10^5$ repetitions, whereas in the two-phase composition of two-component compounds the contrast was about 5% lowered after $10^4$ repetitions.

In FIG. 31, the average crystal grain size each after $10^2$, $10^4$ and $10^6$ repetitions are shown, where the single phase composition of three-component compound had substantially equal crystal grain size throughout, whereas the composition that precipitates two-component compounds in two phases had a tendency to increase the crystal grain size with increasing number of repetitions. This is because, when two two-component compounds having different surface energies are formed in two phases, the surface energies will be higher than at the crystal grain boundaries of the same species compounds themselves and thus a change takes place in such a directoin as to reduce the surface area. That is, repetition characteristics of the composition that precipitates the compounds in two phases are not better than that of the single phase composition of three-componerit compound. As described above, the present optical recording medium can attain high speed recording and high speed speed erasing that cannot be obtained with the conventional optical recording medium.

What is claimed is:

1. An optical recording medium, which comprises a recording layer itself capable of reversibly undergoing a phase change between a crystalline state and an amorphous state by irradiation of an electromagnetic energy and reversibly undergoing a reflectivity change due to the phase change, the recording layer consisting essentially of $Bi_2SeTe_2$, said material having a single phase in the crystalline state of $Bi_2SeTe_2$.

2. An optical recording medium which comprises a recording layer itself capable of reversibly undergoing a phase change between a crystalline state and an amorphous state by irradiation of an electromagnetic energy and reversibly undergoing a reflectivity change due to the phase change, the recording layer consisting essentially of $Sb_2SnTe_4$, said materil having a single phase in the crystalline state of $Sb_2SnTe_4$.

3. An optical recording medium, which comprises a recording layer itself capable of revesibly undergoing a phase change between a crystalline state and an amorphous state by irradiation of an electromagnetic energy and reversibly undergoing a reflectivity change due to the phase change, the recording layer consisting essentially of $Au_2Sb_2Te_3$, said material having a single phase in the crystalline state of $Au_2Sb_2Te_3$.

4. An optical recording medium, which comprises a recording layer itself capable of revesibly undergoing a phase change between a crystalline state and an amorphous state by irradiation of an electromagnetic energy and reversibly undergoing a reflectivity change due to the phase change, the recording layer consisting essentially of $AgSbTe_2$, said materil having a single phase in the crystalline state of $AgSbTe_2$.

5. An optical recording medium, which comprises a recording layer itself capable of revesibly undergoing a phase change between a crystalline state and an amorphous state by irradiation of an electromagnetic energy, the recording layer consisting essentially of $In_3SbTe_2$ and not more than 5% by atom of at lteast one of Ag, Sn and Cu, said recording layer having a single phase in the crystalline state.

* * * * *